(12) United States Patent
Batson et al.

(10) Patent No.: US 10,281,143 B2
(45) Date of Patent: May 7, 2019

(54) PRE-MIX FUEL-FIRED APPLIANCE WITH IMPROVED HEAT EXCHANGER INTERFACE

(71) Applicant: Rheem Manufacturing Company, Atlanta, GA (US)

(72) Inventors: Mickey E. Batson, Lavaca, AR (US); Darryl J. Farley, Fort Smith, AR (US); Reza Khatami, Montgomery, AL (US); Divakar Mantha, Montgomery, AL (US); Tyson J. Cogburn, Roland, OK (US); Nathan T. Whalen, Alma, AR (US); Qian Zhang, Montgomery, AL (US); Shawn A. Reed, Charleston, AR (US); Timothy J. Shellenberger, Tyrone, GA (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 170 days.

(21) Appl. No.: 15/406,567

(22) Filed: Jan. 13, 2017

(65) Prior Publication Data
US 2018/0202652 A1 Jul. 19, 2018

(51) Int. Cl.
*B64D 13/08* (2006.01)
*F24H 3/00* (2006.01)
(Continued)

(52) U.S. Cl.
CPC .......... *F23D 14/02* (2013.01); *F23D 2203/00* (2013.01); *F23D 2206/00* (2013.01); *F23Q 3/00* (2013.01)

(58) Field of Classification Search
CPC ........... F23D 14/02; F23D 14/04; F23D 14/08
(Continued)

(56) References Cited

U.S. PATENT DOCUMENTS 2,110,209 A * 3/1938 Engels .................. F26B 21/002
110/205
5,042,453 A 8/1991 Shellenberger
(Continued)

FOREIGN PATENT DOCUMENTS

| CN | 204438856 U | 7/2015 |
|----|-------------|--------|
| RU | 161267 U1 | 4/2016 |
| WO | 2007/088458 A1 | 8/2007 |

OTHER PUBLICATIONS

International Search Report and Written Opinion for corresponding PCT application No. PCT/US2018/013646 dated May 15, 2018.

*Primary Examiner* — Vivek K Shirsat
(74) *Attorney, Agent, or Firm* — King & Spalding LLP

(57) ABSTRACT

A fuel-fired heating appliance comprises a burner and a first housing adjacent the burner so that an interior of the first housing receives combustion gasses from combustion at the burner. A heat exchanger defines a second housing with an inlet proximate an outlet of the first housing so that the inlet of the second housing receives combustion gasses from the outlet of the first housing, and wherein the first and second housings attach at an interface. A barrier extends within, and across an interface between, the outlet of the first housing and the inlet of the second housing and defines a thermal resistance that inhibits heat transfer from the combustion gasses to the interface.

14 Claims, 17 Drawing Sheets

(51) Int. Cl.
   *F24H 3/06*  (2006.01)
   *F23D 14/02* (2006.01)
   *F23Q 3/00*  (2006.01)

(58) Field of Classification Search
   USPC .......................................... 126/116 R, 109
   See application file for complete search history.

(56) References Cited

U.S. PATENT DOCUMENTS

| | | | |
|---|---|---|---|
| 5,406,933 | A | 4/1995 | Lu |
| 5,546,925 | A | 8/1996 | Knight et al. |
| 6,880,548 | B2 | 4/2005 | Schultz et al. |
| 8,167,610 | B2 | 5/2012 | Raleigh et al. |
| 9,033,696 | B2 | 5/2015 | Carey et al. |
| 9,316,411 | B2 | 4/2016 | Sherrow et al. |
| 2002/0076669 | A1* | 6/2002 | Riepenhoff ............. F23M 9/06 431/354 |
| 2010/0248175 | A1* | 9/2010 | Cain ....................... F23D 14/02 432/1 |
| 2010/0310998 | A1* | 12/2010 | Raleigh .................. F23D 14/58 431/8 |
| 2013/0203003 | A1* | 8/2013 | Cain ....................... F23D 14/02 432/11 |
| 2015/0369495 | A1 | 12/2015 | Maricic et al. |
| 2016/0040905 | A1 | 2/2016 | Shellenberger et al. |
| 2016/0047548 | A1 | 2/2016 | Farley et al. |

* cited by examiner

PRE-MIX FUEL-FIRED APPLIANCE WITH IMPROVED HEAT EXCHANGER INTERFACE

FIELD OF THE INVENTION

The present invention generally relates to fuel-fired heating appliances, such as furnaces, water heaters, and boilers, and more particularly relates to fuel-fired furnaces having pre-mix fuel systems.

BACKGROUND OF THE INVENTION

Furnaces, often used to heat households and buildings, generally burn a combustible fuel (e.g., natural gas) in a burner to produce hot combustion gasses, which, in turn, provide heat to a heat exchanger before the combustion gasses are exhausted outside the building. Commonly, the hot combustion gasses travel through one or more heat exchanger tubes, and a blower forces air across the heat exchanger tubes, thereby transferring heat from the hot combustion gasses to the air, the air then being distributed throughout the building via ductwork.

SUMMARY OF THE INVENTION

One or more embodiments of the present invention relate to an improved fuel-fired heating appliance using premix burner technology. In certain embodiments, a heat exchanger tube is held in at an interface by a swaged union which is near the outlet of the burner. To prevent excessive thermal stresses on the swaged union, certain measures are taken to thermally insulate the union.

In one embodiment, a fuel-fired heating appliance has a burner, a first housing adjacent the burner so that an interior of the first housing receives combustion gasses from combustion at the burner, and a heat exchanger defining a second housing with an inlet proximate an outlet of the first housing so that the inlet of the second housing receives combustion gasses from the outlet of the first housing. Heat from the combustion gasses is conducted through the second housing and transferred to air adjacent to an exterior of the second housing. A barrier extends within, and across an interface between, the outlet of the first housing and the inlet of the second housing so that the barrier is disposed between the interface and the combustion gasses as the combustion gases flow through the outlet of the first housing and the inlet of the second housing. The barrier defines a thermal resistance that inhibits heat transfer from the combustion gasses to the interface.

In a further embodiment, a fuel-fired heating appliance has a burner having at least one outlet through which hot combustion gasses are exhausted, a heat exchanger in fluid communication with the at least one outlet of the burner comprising at least one combustion output tube, and a mounting bracket connected to the burner and the heat exchanger and having at least one hole therethrough. The at least one outlet is attached to the bracket at the at least one hole from a first side of the bracket, and the at least one combustion tube is attached to the bracket at the at least one hole from a second side of the bracket so that the at least one outlet and the at least one combustion output tube are disposed in fluid communication with each other across the bracket via the hole so that the hot combustion gasses flow from the at least one outlet to the at least one combustion output tube. An insulating barrier is at least partially disposed within the at least one combustion output tube between the hot combustion gasses and an interface between the mounting bracket and the at least one combustion output tube at the at least one hole. The barrier defines a thermal resistance that inhibits heat transfer from the hot combustion gasses to the interface.

A fuel-fired heating appliance has a burner having a refractory that encloses a volume extending from a burner surface at which combustion occurs so that the volume receives hot combustion gasses exhausted from the combustion, a heat exchanger in fluid communication with the volume and comprising a combustion output tube, and a mounting bracket connected to the burner and the heat exchanger and having a hole therethrough. The burner is attached to the bracket at the hole from a first side of the bracket, and the combustion output tube is attached to the bracket at the hole from a second side of the bracket so that the volume and the combustion output tube are disposed in fluid communication with each other across the bracket so that the hot combustion gasses flow from the volume to the combustion output tube. A portion of the refractory extends into the combustion output tube between the hot combustion gasses and an interface between the mounting bracket and the combustion output tube. The portion of the refractor defines a thermal resistance that inhibits heat transfer from the hot combustion gasses to the interface.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
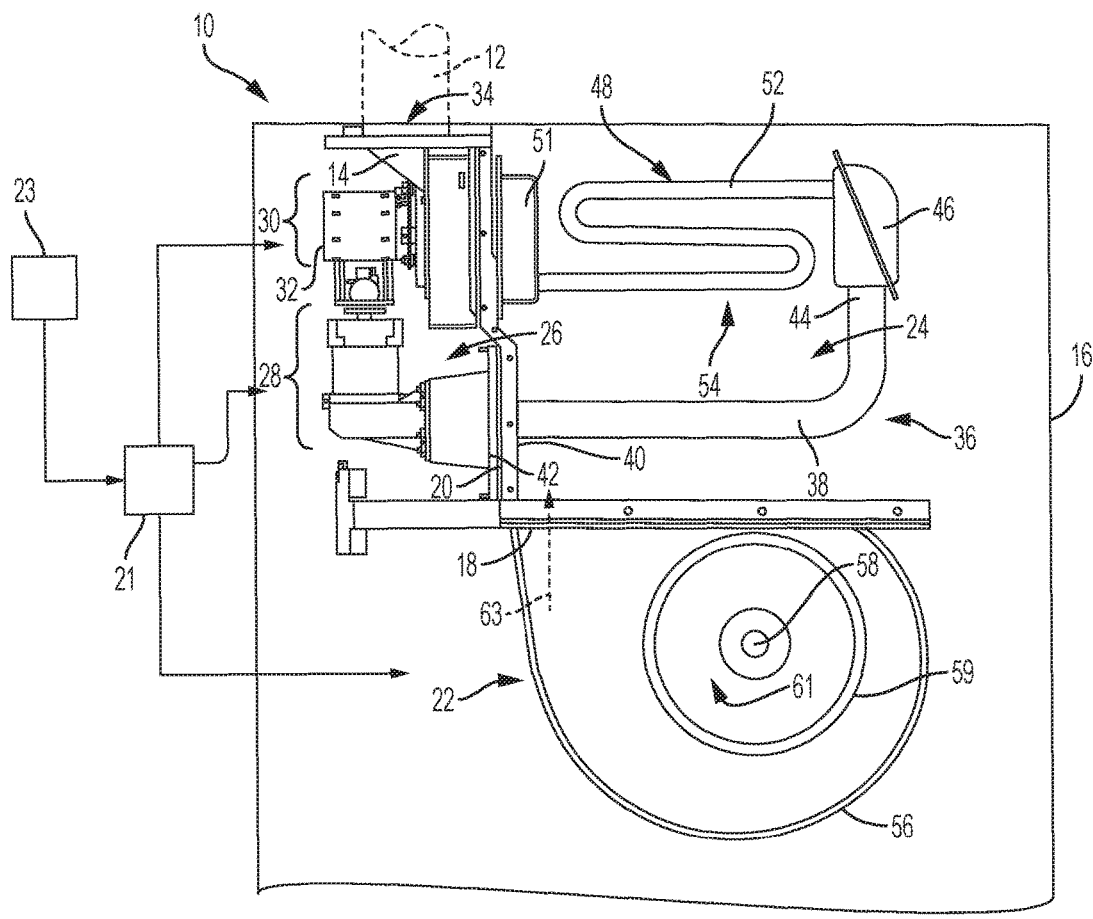
FIG. 1 is a partial schematic elevational view of a fuel-fired forced air heating furnace having a premix burner assembly, in accordance with an embodiment of the present invention.

Repeat use of reference characters in the present specification and drawings is intended to represent same or analogous features or elements of the invention according to the disclosure.

DESCRIPTION OF THE PREFERRED EMBODIMENTS

Reference will now be made in detail to embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the fuel-fired heating appliance, such as but not limited to "vertical," "horizontal," "upper," "lower," "above," or "below," refer to directions and relative positions with respect to the appliance's orientation in its normal intended operation, as indicated in the Figures herein. Thus, for instance, the terms "vertical" and "upper" refer to the vertical direction and relative upper position in the perspectives of the Figures and should be understood in that context, even with respect to an appliance that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

FIG. 1 illustrates a representative fuel-fired heating appliance, e.g. a forced air heating furnace 10, having incorporated a NOx reducing device(s) in accordance with one or more embodiments of the present invention. Furnace 10 is a forced air appliance to be used in a heating, ventilation, and air conditioning (HVAC) system of a building. In a forced air system, an air handler connects to a ductwork ventilation system that distributes air as part of the HVAC system and returns it to the air handler. An air handler blower draws air from a temperature conditioned space within the building through the ductwork ventilation system. The ductwork is in fluid communication with an input flange (not shown) of a housing 16 of furnace 10 that surrounds an opening through housing 16. A lower portion of housing 16 encloses a plenum 22 in which an air handler blower 56 is disposed. The blower has an input thereto (perpendicular to the page from the perspective as shown in the drawing) that is fluidly connected through the opening in housing 16 to the ductwork so that the blower draws air from the conditioned space via the ductwork and the opening into the blower and having an output fluidly connected to an opening through an interior partition 18 separating plenum 22 from a flow passage 24 in the interior of furnace housing 16 so that air handler blower 56 pushes the received air into flow passage 24 so that the air passes over a heat exchanger 36 and moves through a through-outlet (not shown) of housing 16 and into outlet ductwork attached to the output side of housing 16 that directs the now-warmed air back into the conditioned space. Alternatively, blower 56 may be outside housing 16 and disposed within the ductwork or in line with the ductwork. A thermostat 23 mounted within the conditioned space has a temperature sensor that senses temperature in the conditioned space. A processor or temperature responsive mechanical device in the thermostat compares the temperature to a set point temperature set by a user through an interface at the thermostat and, depending on that comparison, may send a signal to a controller 21 requesting that the controller actuate the furnace or, more specifically, actuate the burner (discussed below) to provide warm combustion exhaust to the heat exchanger and actuate air handler blower 56 to move air over the heat exchanger. Example of constructions and operations of furnaces are disclosed in U.S. Pat. No. 5,406,933, granted Apr. 18, 1995, U.S. Pat. No. 4,960,012, granted Oct. 10, 2002, and application numbers 2016/0047548, filed Aug. 12, 2014, and 2016/0040905, filed Aug. 6, 2014, the entire disclosures of which are incorporated by reference.

While the illustrated embodiment is a forced air furnace, it should be understood that other embodiments may be realized in other appliances, for example water heaters and boilers. Thus, for example, the heat exchanger in a gas-fired water heater may be a flue pipe that extends through the water tank interior, which communicates with a secondary flue pipe outside the water heater. Accordingly, while the present discussion presents one or more embodiments in the form of a furnace, it should be understood that this is for purposes of example only, and that the present invention may be embodied in other appliances.

Outer housing 16 connects to respective horizontal and vertical partition members 18, 20 (which may be considered part of the housing) that divide the interior of housing 16 into return air plenum 22, supply air flow passage 24, and an equipment chamber 26. Each partition may be a generally sheet-like structure. Horizontal partition member 18 divides the interior of housing 16 into return air plenum 22 and supply air flow passage 24 so that the only fluid communication between the two areas is the through-hole for the output of blower 56. As discussed above, air handler blower 56 pulls air from the ducting from the conditioned space into plenum 22 and pushes the received air into supply air flow passage 24 through that hole. Equipment chamber 26 is also positioned above horizontal partition 18 but to the left of vertical partition 20 and flow passage 24. Similar to partition 18, partition 20 completely separates its opposing chamber except for one or more through-holes as described herein. Housing 16 encloses furnace 10 except for air entrances, a flue exit, and service doors.

Equipment chamber 26 encloses a low NOx burner assembly 28. Above burner assembly 28, and also to the left of vertical partition member 20, is an induction draft blower 30. Blower 30 has a motor 32, a flue adaptor 14, which may include an ambient air inlet as described below, and an upwardly facing outlet 34 connectable to external exhaust flue 12.

Operatively disposed within supply air flow passage 24 is a combustion heat exchanger 36 having a primary heat exchanger portion defined by two L-shaped metal combustion output tubes 38 (one of which is visible in FIG. 1). Each of the L-shaped metal tubes 38 has two ends. An open first end 40 is connected to an end of a burner outlet 42 so that the end of tube 38 is in fluid communication with burner outlet 42 to receive combustion gases therefrom, and an open second upward turned end is connected to and in fluid communication with an inlet manifold 46 to deliver the combustion gases thereto.

Heat exchanger 36 also includes a secondary heat exchanger section 48 that is disposed within an upper portion of air flow passage 24 and that includes inlet manifold 46 connected to upward turned end 44 of L-shaped metal combustion output tubes 38, and an outlet manifold 51 connected to and in fluid communication with an inlet of induction draft blower 30. The interiors of inlet and outlet manifolds 46, 51 are communicated to each other by a plurality of vertically serpentine, or coiled, metal secondary heat exchanger tubes 52 that are horizontally spaced apart from each other in a front-to-rear direction (i.e. into and out of the page view of FIG. 1) and connected at their opposite ends to and in fluid communication with inlet and outlet manifolds 46, 51. Only one of tubes 52 is visible in FIG. 1, the remaining tubes 52 being positioned behind single visible tube 52. As illustrated, each tube 52 has a diameter smaller than the diameter of each tube 38.

The configuration of air handler blower 56 may vary as desired, but, in the illustrated embodiment, the blower is a squirrel-cage blower with a finned ring 59 driven by an induction electric motor 58 so that air enters blower 56 through an inlet 61 via ductwork and exits the blower through an outlet and an opening in generally plate-like horizontal member 18, as indicated at 63. Air 54 forced upwardly by blower 56 through supply air passage 24 moves over tubes 38 and 52 and is then discharged through a housing outlet opening (not shown) for delivery by supply ductwork (not shown) to the conditioned space served by furnace 10.

At the same time, operation of a gas burner in low NOx burner assembly 28 creates flames that are drawn into open left end 40 of primary combustion output tubes 38 by the operation of induction draft blower 30, which creates a negative pressure within heat exchanger tubes 52, manifolds 46 and 51, and tubes 38. This negative pressure is therefore also present at the burner's surface, causing hot gas to flow through heat exchanger tubes 38 and 52 from the burner to blower 30. The flames generate hot combustion gases that blower 30 draws sequentially through tubes 38, inlet manifold 46, tubes 52, and outlet manifold 51, and then discharges to atmosphere via exhaust flue pipe 12. As air 54 externally traverses heat exchanger 36, combustion heat transfers from the combustion gases in the tube interior volumes to the traversing air through the tube walls. That is, heat transfer occurs across walls of the tubes.

Figure 2:
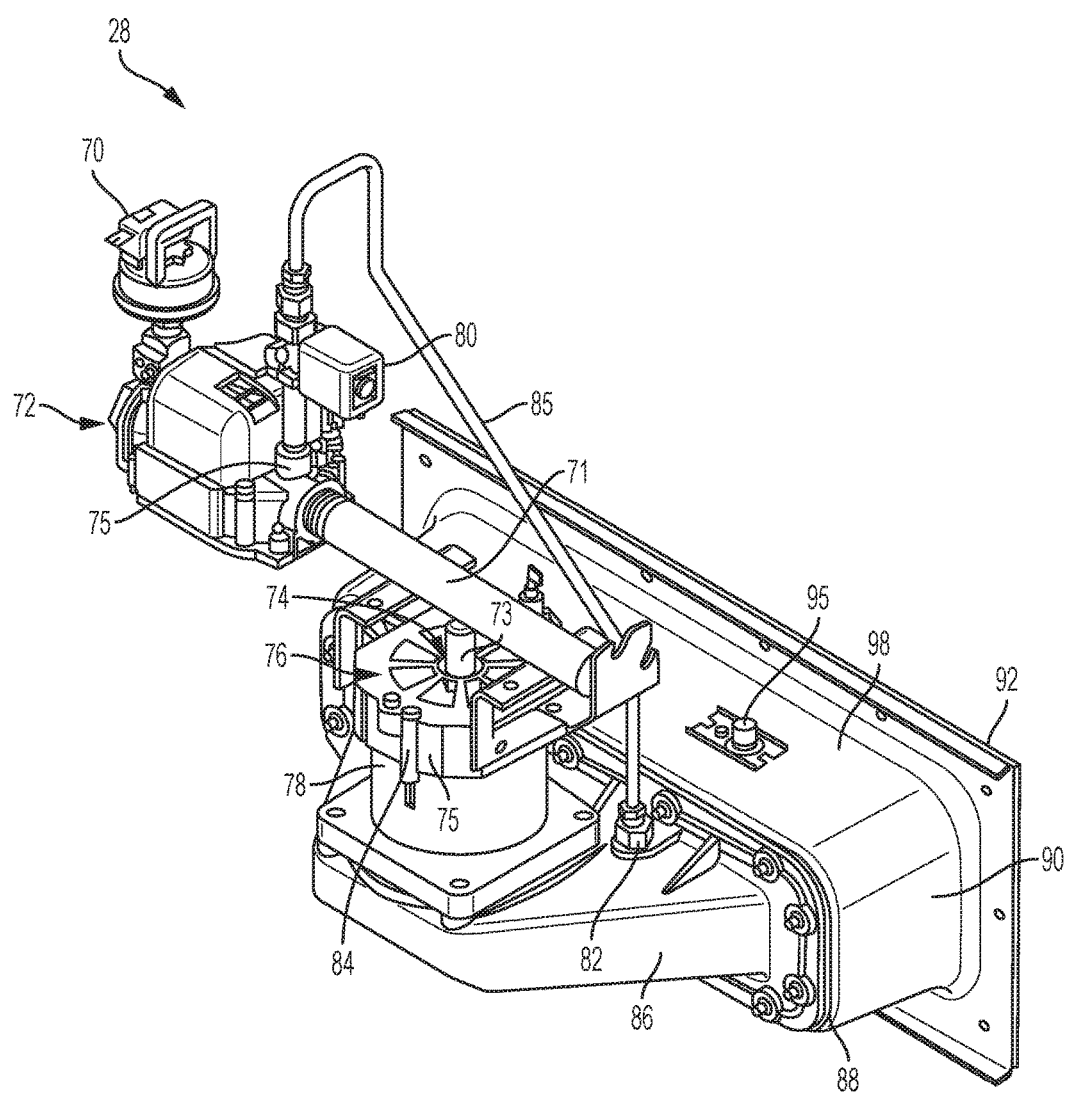
FIG. 2 is a perspective view of an embodiment of the premix burner assembly as shown in FIG. 1.

FIG. 2 is an enlarged perspective view of the premix burner assembly 28 as shown in FIG. 1. The components include, but are not limited to, a low line (supply) gas pressure shutoff switch 70, a gas valve 72, an input gas line (not shown) fluidly connected to an input port of gas valve 72, a gas delivery tube 71 fluidly connected to and extending from an output port of valve 72 and having a gas delivery portion 73 extending from a horizontal portion of tube 71 into a fuel-air mixing chamber 79 (FIG. 3) within a chamber housing 78 via a gas orifice 74, an air diffuser 76 by which ambient air enters chamber 79, a fuel enrichment system (comprising a fuel enrichment solenoid 80 and a fuel enrichment fitting 82), a flame sensor light-emitting diode (LED) 84, a mixing chamber 86, a gasket 88, a burner box 90, and a plate gasket 92.

Figure 3:
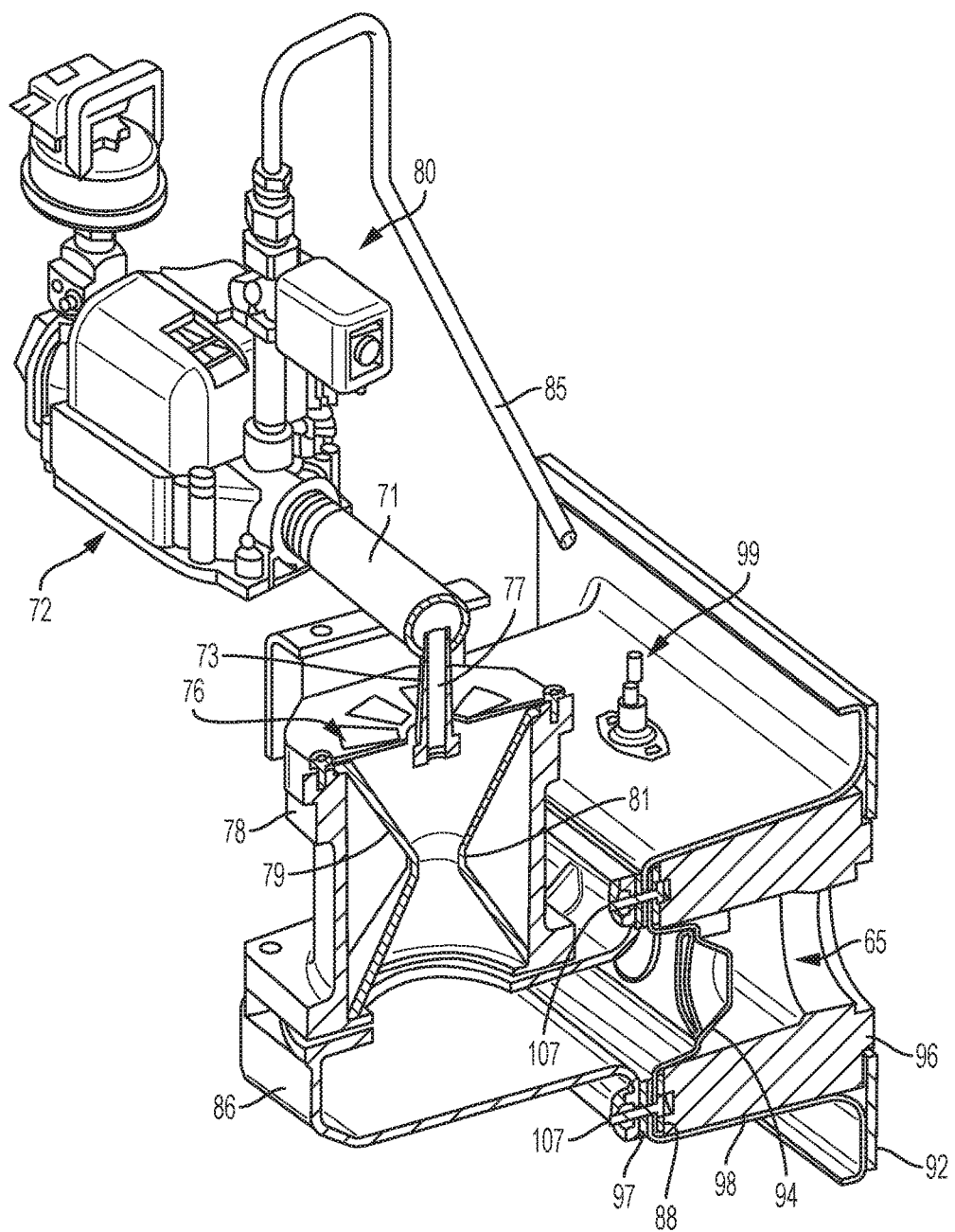
FIG. 3 is a partial sectional perspective view of the premix burner assembly as shown in FIG. 2.

Referring to FIG. 3, the fuel-air mixing chamber in one embodiment is of the Venturi-type. Valve 72 selectively restricts or allows gas from the gas supply line (not shown) to pass into gas delivery tube 71 under the gas line pressure. The tube's gas delivery portion 73 defines a through-passage 77 having a predetermined cross sectional area/diameter so that, given the pressure of the gas delivered by primary tube 71, the gas exits tube 71 into an upper part of fuel-air mixing chamber 79 at a flow rate that, in conjunction with the negative pressure created by induction draft blower 30 presented to mixing chamber 79 through burner box 90 and mixing chamber 86, moves the gas flow through a restricted neck portion 81 of chamber 78. The cross-sectional diameter restriction at neck portion 81 increases the speed of the volume of gas and air flowing therethrough, thereby decreasing pressure in the Venturi device and drawing air, which is ambient to burner assembly 28 (FIG. 1) within housing 16 upper part 26 (FIG. 1), into chamber 79 via through-holes that comprise air diffuser 76 and mixing the fuel and air. The configuration of the system between the Venturi device (79) and induction draft blower 30 being known, and the gas flow rate being determined in view of the gas input line pressure, and the pressure within the Venturi device being known and controllable (through selection of the cross-sectional area of neck portion 81), the mix ratio of air to fuel is otherwise controlled through selection of the negative pressure applied by (which may be described in terms of the "speed" of) induction draft burner blower 30.

An air flow passage may be considered to be defined between an air source (in the illustrated embodiments, the area ambient to the mixing chamber) and the burner. In the premix burner system described herein, the air passage at least partially overlaps the fuel flow passage from the main gas valve. As described below, the combustion area about the burner surface is sealed from the inflow of ambient air. Accordingly, given a structure of the components of the burner assembly discussed above, the air-to-fuel ratio, and the rate at which the air/fuel mixture is drawn to the burner, are defined by the setting of gas valve 72 and the speed of induction draft blower 30. These parameters, along with the above-described burner assembly structural components, are chosen (e.g. through testing and/or modeling) to achieve a desired level of combustion at the burner surface when the burner and the furnace operates at equilibrium. In particular, the reduction or substantial elimination of secondary (i.e. other than as part of the premix) air inflow to the combustion area about the burner surface means that the air-to-fuel ratio and air/fuel mixture flow rate can be controlled to reduce the amount of excess air in the combustion chamber, i.e. air beyond that needed for combustion, thereby reducing NOx production as compared to atmospheric-type burners and furnaces. Burner assembly 28 and induction draft blower 30 can be configured and operated so that the furnace emits less than 20 ng/J, though it should also be understood that the particular configuration and operation of these components with regard to the particular air/fuel mixture ratio and flow rate, and the particular air/fuel mixture ratios and flow rates and NOx emission levels, in a given furnace configuration at equilibrium can vary as desired. Moreover the structures of burner assembly 28 for injecting gas and drawing in air can be varied, and the discussion of burner assembly 28 provided herein should be understood to be for purposes of example only.

Figure 4:
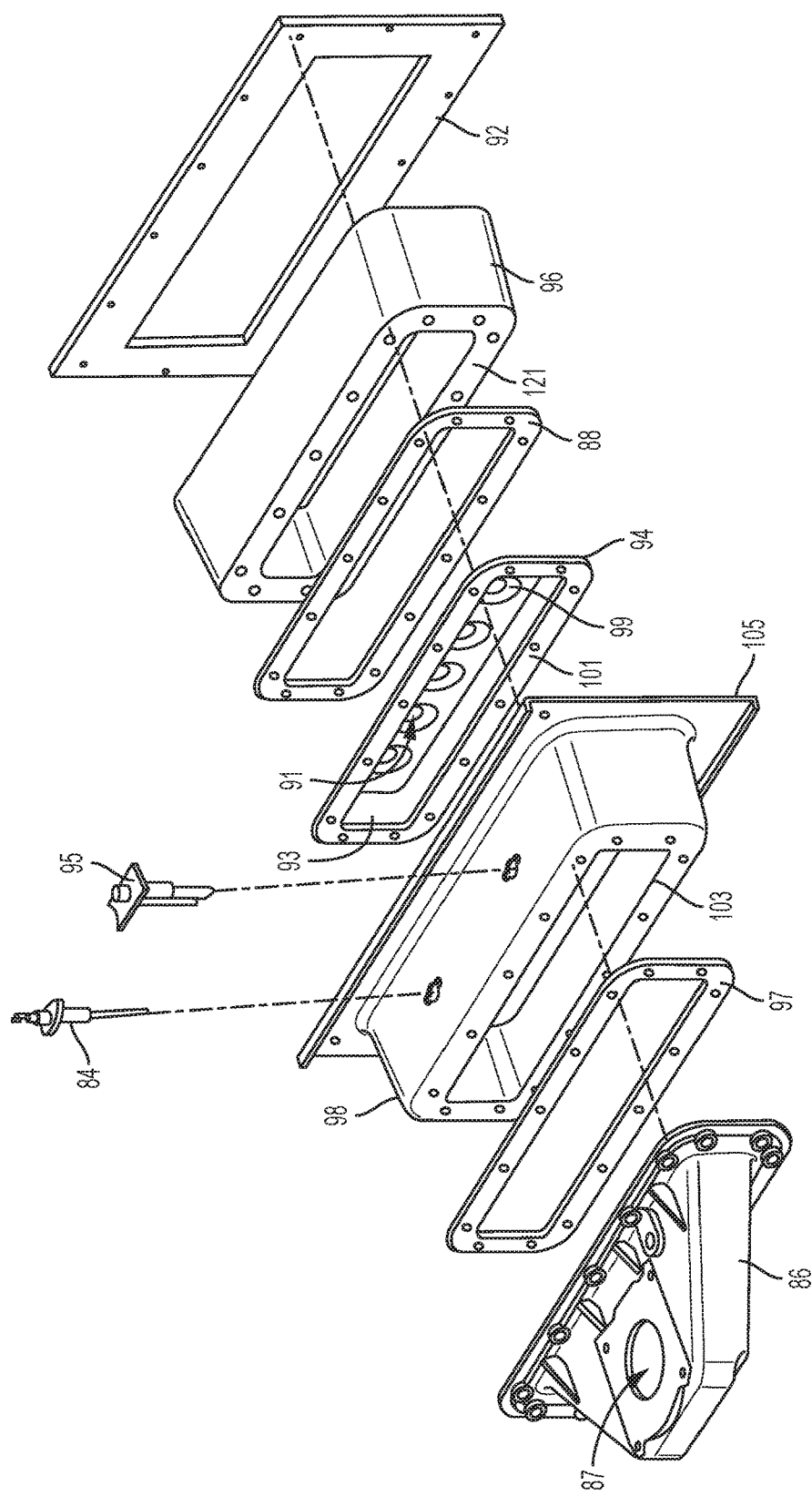
FIG. 4 is an exploded view of components of the premix burner assembly as shown in FIG. 1.

Referring to FIGS. 3 and 4, immediately below fuel/air mixing chamber 79 is a continuation 86 of the mixing chamber, into which the fuel/air mixture from chamber 79 flows through a hole 87 in the top of chamber 86. Although the gas and air are drawn together in chamber 79, they may not thoroughly mix together to provide a consistently mixed fuel. Chamber portion 86 therefore provides a volume within which the fuel and air can so mix, for delivery of a consistent fuel/air mixture to the burner. From the interior volume of chamber 86, the negative pressure applied by induction draft blower 30 (FIG. 1) draws the fuel/air mixture into the interior volume of a combustion chamber housing 98, which is attached to mixing chamber 86 by a plurality of screws 107 or other suitable devices, with a gasket 97 disposed between the components to seal their connection. Within combustion chamber housing 98 is disposed a burner 94. Burner 94 has a main, thin metal portion 93 that may, in certain embodiments, comprise a mesh, and in the illustrated embodiments comprises a solid mesh sheet defining five spaced apart domes 91 at the end of forwardly-facing frustoconical portions 99 so that domes 91 at portions 99 form burn distribution structures. In operation, the flame extends across the entire mesh, so domes 91 provide greater surface areas, in line with tubes 38, upon which the flame burns than if the mesh had a flat surface. As should be understood, in embodiments where the burner has a mesh surface, the edges of the mesh interstices form a flame-holding structure.

The burner surface is surrounded by a circumferential flange 101 that abuts an inwardly facing flange 103 of housing 98 in the component stack. A gasket 88 abuts the opposing side of flange 101 and sealingly separates flange 101 from a forward face 121 of a refractory 96, for example made of silica, alumina, or other suitable insulating material, which inhibits the loss of heat outward from the combustion chamber interior. Burner main plate 93 and frustoconical portions 99 extend forwardly into the interior volume of refractory 96, which thereby acts as an insulator to the combustion that occurs within the combustion chamber. A plate seal 92 extends radially outward so that it abuts an outer flange 105 of combustion chamber housing 98, and is attached thereto by pins, screws, rivets or the like (not shown) extending through aligned holes in plate seal 92 and flange 105, but extends sufficiently inward to abut a rectangular cutout portion around the periphery of the forward face of refractory 96. An inward portion of the forward face of refractory 96 extends into the inner circumference of plate seal 92 so that the inner portion of the forward face of refractory 96 is flush with the opposing side of plate seal 92. A plurality of screws, bolts, pins, rivets, etc. 107 extend through corresponding holes in gasket 88, flange 101 of burner 94, flange 103 of combustion chamber housing 98, gasket 97, and combustion chamber 86 to hold those components together with respect to each other. Refractory 96 defines a plurality of holes in its front face 121 to receive the ends of attachment devices 104 but is not attached to them. Refractory 96 is slidably received in the combustion chamber and secured to housing 98 by plate seal 92.

As noted, the forward faces of plate seal 92 and refractory 96 form a flush forward-facing surface. This surface abuts center panel 20 (FIG. 1), which in this embodiment has a generally planar metal sheet as a primary member. At the section thereof at which the burner assembly attaches to center panel 20, the main sheet of center panel 20 defines a plurality of through-holes that align with a corresponding plurality of through-holes in the front face of refractory 96, one of which is visible in FIG. 3, so that center panel 20 partially defines (along with refractory 96) a first housing adjacent the burner. Housing 98 attaches to center panel 20 via screws through outer flange 105 and through center panel 20, thereby holding plate seal 92 and refractory 96 against center panel 20. The through-holes have diameters comparable to the outer diameters of the three combustion output tubes 38, and the forward ends 40 of tubes 38 (FIG. 1) attach to center panel 20 at the through-holes as described below, so that the interior of combustion chamber 65 is fluidly connected to the interior of combustion output tubes 38 through the through-holes in center panel 20 and the holes in the forward face of refractory 96.

Figure 5:
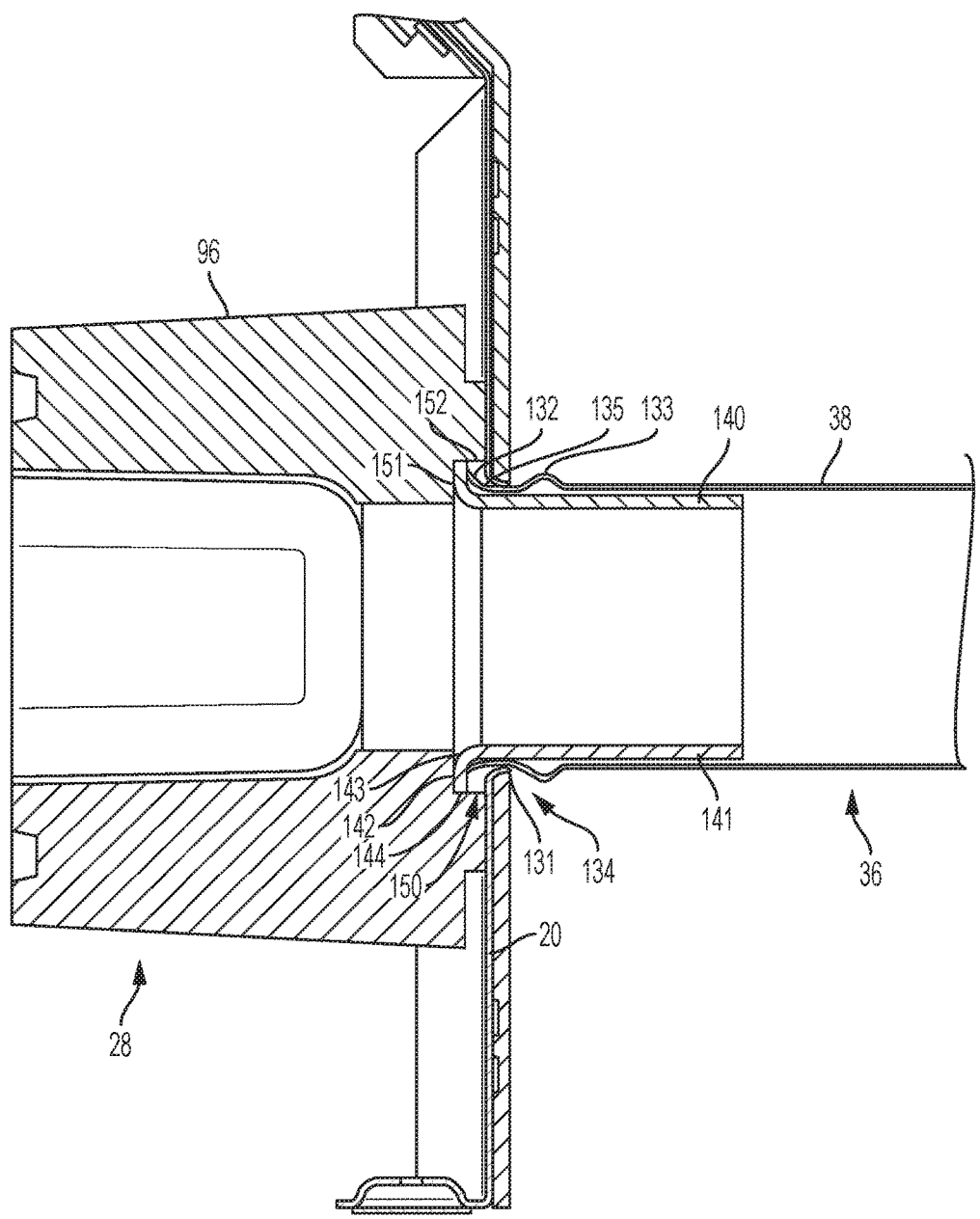
FIG. 5 is a partial section view of an interface between the premix burner assembly and a heat exchanger.
Figure 6:
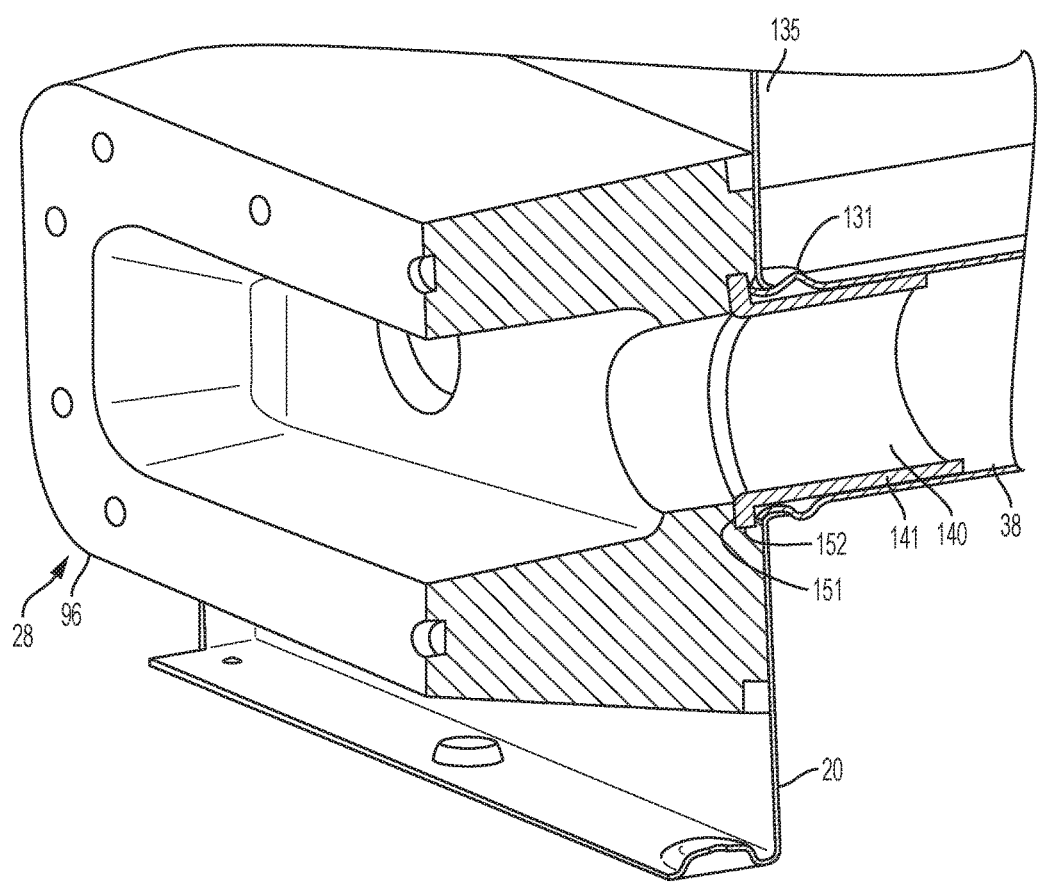
FIG. 6 is a partial perspective view of the interface between the premix burner assembly and the heat exchanger as shown in FIG. 5.

FIGS. 5 and 6 show a partial section view and a partial perspective view of an interface between a housing of burner assembly 28 and a housing of heat exchanger 36. The surface of center panel 20 (which may be considered a mounting bracket between the burner assembly and the heat exchanger and to which those two components attach) near each of the through-holes in center panel 20 depends outward from the plane of generally planar center panel 20 and away from burner assembly 28, creating a lip 131 at each through-hole, each lip 131 defining a minimum inner diameter for its corresponding through-hole and a plane defined by each through-hole at a location along tube 38's axis defining the minimum inner diameter. Forward end 40 (FIG. 1) of each combustion output tube 38 extends through a respective through-hole and has a radially outward surface that biases into lip 131 (i.e. the surface's outer diameter is greater than the inner diameter of the lip), leaving a portion 135 of first end 40 (FIG. 1) of tube 38 protruding past center panel 20 toward the burner.

Tube 38 is then swaged, creating circumferential annular deformations on each side of the planes defined by each through-hole's minimum inner diameter and adjacent to lip 131, each deformation having a diameter greater than the inner diameter of lip 131, thus preventing tube 38 from moving axially (with respect to the elongation axis of tube 38 and the center axis of the through-hole) with respect to center panel/mounting bracket 20, such that center panel 20 mounts tube 38 in position with respect to the burner assembly. In the illustrated embodiment, swaged tube 38 forms a frustoconical distal end 132 on the burner side of lip 131 that has a diameter slightly greater than the inner diameter of the through-hole at the point where tube 38 meets lip 131 so that the outer surface of end 132 biases against lip 131 in the radially outward direction, and an annular ridge 133 on the heat exchanger side of lip 131 such that end 132, annular ridge 133, and the annular trough between them, all have larger outer diameters than the inner diameter of lip 131, thereby creating a tight fit between the end of tube 38 and the through-hole/panel 20 at an attachment interface 134 between the combustion tubes and center panel 20. Various other attachment methods consistent with the present disclosure may be implemented for attaching tubes 38 to the center panel including, but not limited to, welding and the provision of flanges about the outer surface of each output tube 38 to provide a surface for bolting combustion output tube 38 to center panel 20.

Refractory 96 comprises a counterbore recess 150 inward from the forwardmost surface of the refractory of sufficient diameter and depth to receive end portion 135 of tube 38 as well as an insulating barrier, e.g. an insert or sleeve, as discussed below.

Figure 8:
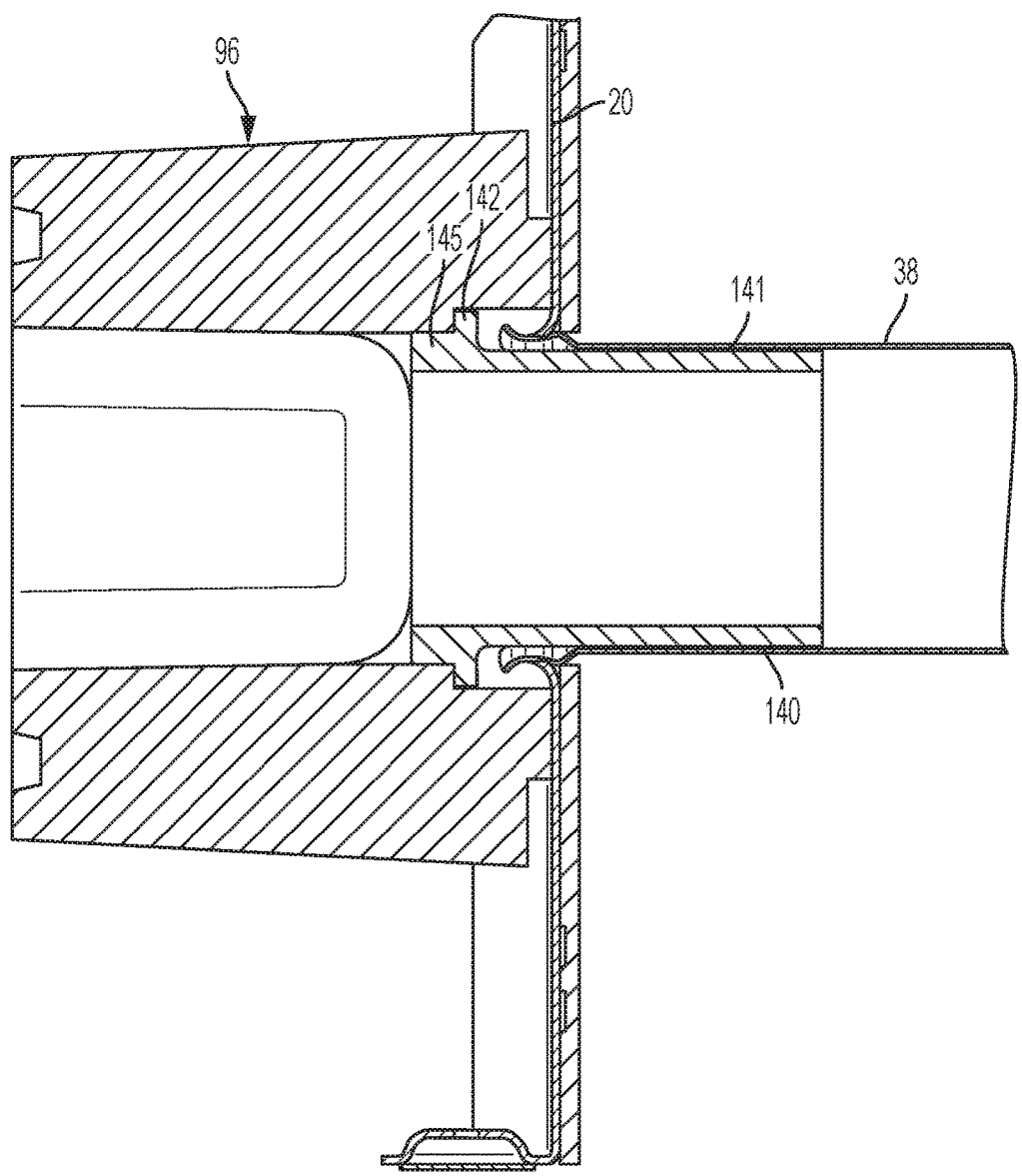
FIG. 8 is a partial section view of the interface between the premix burner assembly and the heat exchanger as shown in FIG. 5, having an alternative thermal barrier.

In further embodiments, one of which is shown in FIG. 8, lip 131 depends towards burner assembly 28 (FIG. 1). Configurations in which lip 131 depends toward burner assembly 28 may necessitate an increased length of portion 135 or a larger diameter at end 40 of tube 38, than if lip 131 depends in the opposite direction, which may, in turn, require modifications to refractory 96 (e.g., increased width or depth of counterbore recess 150 to accommodate for the increased length of portion 135 or diameter of end 40. These modifications may lead to long, thin walls of refractory 96 and thus, increase risk of refractory 96 cracking or breaking.

Figure 13:
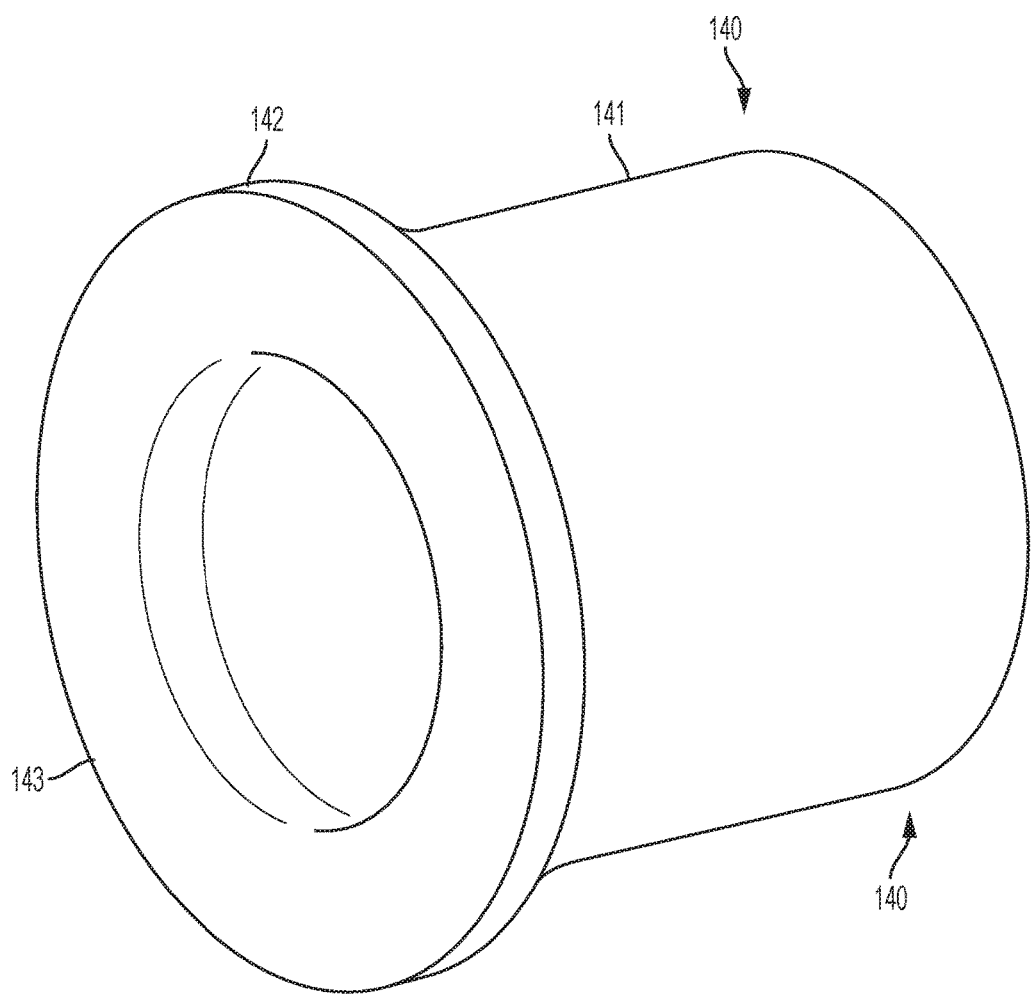
FIG. 13 is a perspective view of a thermal barrier used in the furnace as in FIG. 1.

Referring also to FIG. 13, an insulating barrier, in this example an insert or sleeve 140, is disposed between burner 28 and interface 134, partially within combustion output tube 38 and partially within the housing formed by refractory 96 and center panel 20, and insulates interface 134 from hot combustion gasses exhausted from the burner and flowing through the inner volume defined by refractory 96 to combustion output tubes 38, thereby protecting interface 134 from thermal stresses due to high-temperature thermal cycling that would occur in absence of the barrier. In a simulation of the illustrated embodiment, a series of yield stresses were calculated for various temperatures at interface 134. In a further simulation of the illustrated embodiment, thermal stresses for various temperatures at the interface were modeled. For a preferred set of operating parameters (e.g., the air-to-fuel ratio, the rate at which the air/fuel mixture is drawn to the burner, and the air flow rate across the heat exchanger), the insert of the illustrated embodiment reduces the thermal stresses at the interface below the yield stress and, in certain embodiments, to a thermal stress that is at least 35% to 45% below the yield stress. Insert 140 is cast in a mold and is comprised of a thermally insulating material, such as, for example, a ceramic matrix composite comprising ceramic fiber. Insert 140 is axially symmetrical, having a cylindrical protruding end 141 with annular cross sections that transitions into a flange 142 via an arched portion 143 such that insert 140 has a consistent wall thickness. The thermal resistance of insert 140, generally defined as a function of the insert's wall thickness and thermal conductivity, is sufficient to reduce the temperature of the components of interface 134 during flow of hot combustion gases through refractory 96 and tube 38 from the temperature at which these components would be driven by the combustion gases in absence of insert 140 to a temperature at which the thermal stress of each component (131 and 135) of interface 134 during combustion gas flow is sufficiently below the respective yield stress of each component that plastic deformation of the interface components does not occur during combustion gas flow. As should be understood, the yield stress is the value of stress, at a given temperature, at which a material plastically deforms. Yield stress decreases as temperature increases, such that as a material increases in temperature, the amount of thermal stress needed to plastically deform the material decreases, thereby increasing the likelihood of damage to the part. In the illustrated embodiment, lip 131 of panel 20 and end portion 135 of tube 38 are made of steel. These components have yield stresses that are significantly lower than that of refractory 96, so that lip 131 and end portion 135 will plastically deform before refractory 96, and so that the engagement of lip 131 and end portion 135 is the point at interface 134 at which an opening of the interface will first occur due to thermal stress. Accordingly, insert 140 is configured of such a material, and at such dimensions, that, in presence of the flow of hot combustion gases from the burner assembly, the insert's thermal resistance maintains the temperature of lip 131 and end portion 135 below a level at which thermal stresses within lip 131 and end portion 135 plastically deform those components. That is, the insert maintains the temperature of lip 131 and end portion 135 at a sufficiently low temperature that the yield stress of these two components remains above the thermal stress those components experience during operation of the furnace.

Insert 140 is generally cylindrical with an open, central through-bore that extends therethrough for providing fluid communication between burner assembly 28 and tubes 38. Insert 140 has a wall thickness and thermal conductivity for providing a thermal resistance sufficient to protect interface 134 from being heated past its yield stress. In the illustrated embodiment, insert 140 is 1.5 inches long along the axis of its elongation and has a wall thickness of about one quarter inch, or more precisely 0.22 inches, radially with respect to the elongation axis. In further embodiments, the wall thickness decreases in the direction along the axis away from flange 142 in order to accommodate for a relief angle that facilitates removal of insert 140 from a mold during its manufacture. Several design consideration control the dimensions of insert 140. For example, increasing the length that insert 140 extends into heat exchanger tube 38 lowers the thermal stresses at interface 134, but decreases the efficiency of heat exchanger tube 38 along the portion insulated by the insert. Therefore, the length of insert 140 is optimized to protect interface 134 from failure, while providing adequate heat transfer through heat exchanger tube 38, and may vary, as desired in a given configuration. Further, in some embodiments, insert 140 may be comprised of a brittle ceramic material. Therefore, decreasing the wall thickness may increase fragility of insert 140. However, increasing the wall thickness of insert 140 decreases the through-bore diameter, which restricts airflow through insert 140. Thus, in the illustrated embodiment, the radial (with respect to the elongation axis) wall thickness is optimized for both durability and performance.

Flange 142 seats against a front face 151 of refractory 96 within recess 150 and is held in via a compression fit. In a further embodiment, flange 142 is held in position against front face 151 by an adhesive (e.g., a ceramic binder) disposed between them. The adhesive also forms part of the seal between refractory 96 and front face 151. An outermost surface 144 of flange 142 (furthest from the elongation axis of insert 140) seats against an inner radial surface 152 of recess 150. As will be understood from the present discussion, the outermost diameter of flange 142 will vary due to manufacturing tolerances. Refractory 96, however, has material properties that allow it to deform in order to accommodate variations within a certain tolerance. For example, as long as the outermost surface 144's diameter is greater than inner radial surface 152's diameter, when insert 140 is inserted into counterbore 150, portions of refractory 96 crush out of the way so that radial surface 152 mates with refractory 96's inner radial surface 152 with a press fit. Further using the soft material properties of refractory 96 in order to accommodate for manufacturing tolerances, refractory 96 is manufactured so that counterbore 150's depth is less than the length of tube end portion 135 plus the thickness of flange 142 (in the direction of the elongation axis). During assembly, tube end portion 135 presses against flange 142, which, in turn, presses against front face 151 and crushes a portion of refractory 96 so as to accommodate varying tolerances in counterbore 150's depth and front end 135's protruding length. In this way, flange 142 is sandwiched between refractory 96 and tube end portion 135, thereby further preventing axial movement of insert 140. In further embodiments, an expanding gasket is installed within recess 150, between insert 140 and front end 135. If gaps exist or form between refractory 96 and insert 140, the expanding gasket seals the gap and protects interface 134 from heat within the combustion chamber that might otherwise reach the interface through the gap.

By seating flange 142 to front face 151, interface 134 is fluidly sealed and thermally insulated from direct exposure to hot gasses exiting burner 28. Protruding end 141 of insert 140 extends into tube 38, thereby providing an insulated path through which combustion gasses flow. The external diameter of protruding end 141 is slightly less than the inner diameter of tube 38, thereby allowing insertion into tube 38 but preventing substantial amounts of combustion gasses from reaching interface 134. In some embodiments, because of manufacturing tolerances, the outer diameter of insert 140 may be, for example, one-quarter inch less than tube 38's inner diameter, thereby creating an average gap of ⅛ of an inch between insert 140's outer surface and tube 38's inner surface. The gap between insert 140 and heat exchanger tube 38's inner surface is small in part so as to restrict heat transfer to interface 134 via convection. Further, insert 140 directs the flow of combustion gasses past interface 134. Because there is no fluid outlet in the direction of the burner from the gap between the tube and the insert, a volume of combustion gasses stagnates in the gap. The stagnated volume of combustion gasses, cooled by airflow past tubes 38, shields interface 134 from exposure to hot combustion gasses. Moreover, because the exterior of tube 38 transfers heat to the surrounding air, heat is lost along the length of exterior tube 38 from the end of insert 140 (furthest from burner 28) to interface 134, thereby reducing the temperature experienced by interface 134. In this way, interface 134 is protected from conduction through tube 38.

Figure 7:
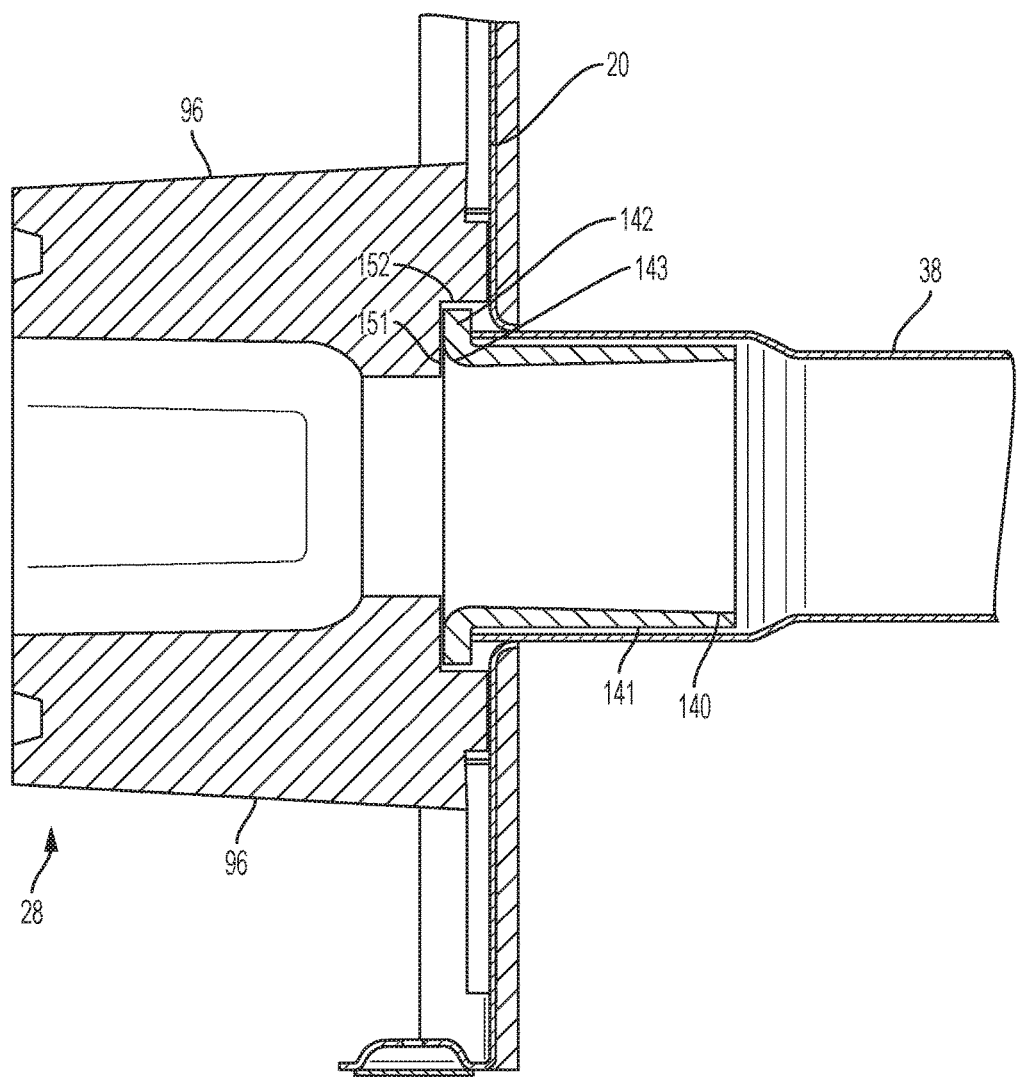
FIG. 7 is partial section view of another interface between a premix burner assembly and a heat exchanger.

FIG. 7 illustrates an alterative embodiment of the barrier and the housing interface, wherein insert 140 is disposed within an end portion that has a greater inner diameter than does the main portion of combustion output tube 38. Further, the wall thickness of insert 140 in the embodiment of FIG. 7 decreases as a function of the axial distance away from burner 28, showing the relief angle discussed above. In the embodiment illustrated in FIG. 7, tube 38 is shown before it is swaged to form interface 134.

Due to manufacturing tolerances, in some embodiments, certain measurements may be non-uniform between manufactures (e.g., the length of tube portion 135 may vary). Thus, variations of embodiments of the present disclosure may accommodate for manufacturing tolerances. For example, to accommodate varying lengths of tube portion 135, the depth of recess 150 (in the direction of tube 38's axis) in refractory 96 may be increased to receive and house a maximum length tolerance for tube portion 135.

Figure 9:
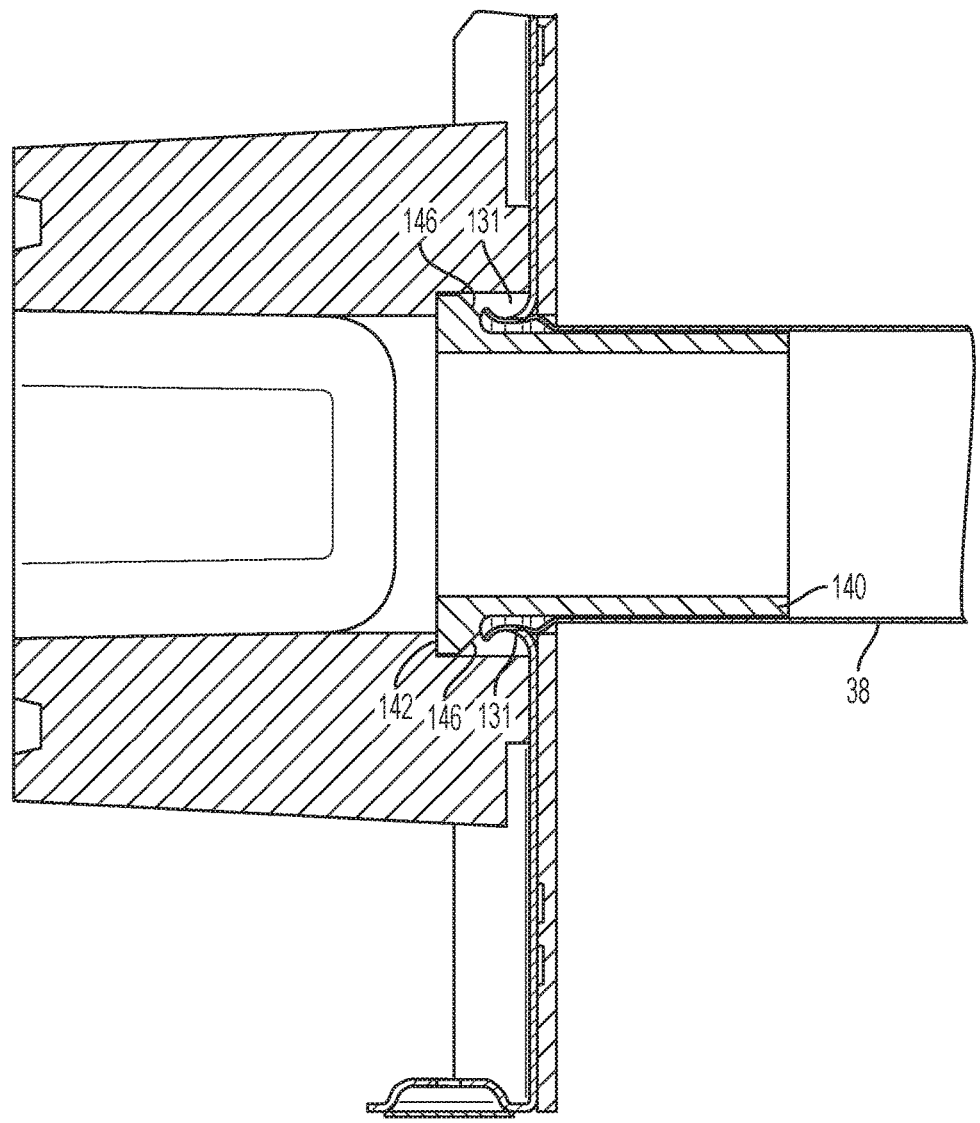
FIG. 9 is a partial section view of the interface between the premix burner assembly and the heat exchanger as shown in FIG. 5, having an alternative thermal barrier.

FIG. 8 illustrates another embodiment of the barrier, in which insert/sleeve 140 has a main generally cylindrical portion 141, an annular flange 142, and a second generally cylindrical portion 145. An outer diameter of each of the outlet holes in refractory 96 is sufficient to receive the outer diameter of second portion 145, and second portion 145 extends into refractory 96 through each of the outlet holes. In order to provide outlet holes in the refractory of sufficient diameter, the diameter of each of the outlet holes of refractory 96 in the embodiment shown in FIG. 8 is increased from that shown in the embodiment of FIGS. 5 and 6. When second protrusion 145 is disposed within the refractory outlet, the refractory outlet centers insert 140 in tube 38. The dimensions of end portion 135 may vary, for example due to manufacturing tolerances and/or the effects of swaging. In order to compensate for varying roundness of tube portion 135, a barrier, for example an insert or sleeve 140 of FIG. 9, defines a chamfered edge 146. As insert 140 is inserted into an end 40 (FIG. 1) of a tube 38, the portion(s) of the edge of end 40 closest to the elongated tube's center axis contacts chamfered edge 146 first. The angle of chamfer 146 is sufficiently shallow so that chamfered edge 146 wedges the portion of forward end 40 touching chamfered edge 146 away from the tube's longitudinal center axis, thereby guiding the outer edge of forward end 40 towards a uniform diameter. If the edge of forward end 40 does not lie on a plane, or if it lies on a plane that is not perpendicular to the longitudinal axis of tube 38, chamfered edge 146 will act as a wedge to bend forward-most portions of forward edge 40 outward, which in turn draws a greater portion of forward edge 40 against insert 140, thereby allowing more of forward edge 40 to mate with insert 140 and causing an improved thermal seal.

Figure 10:
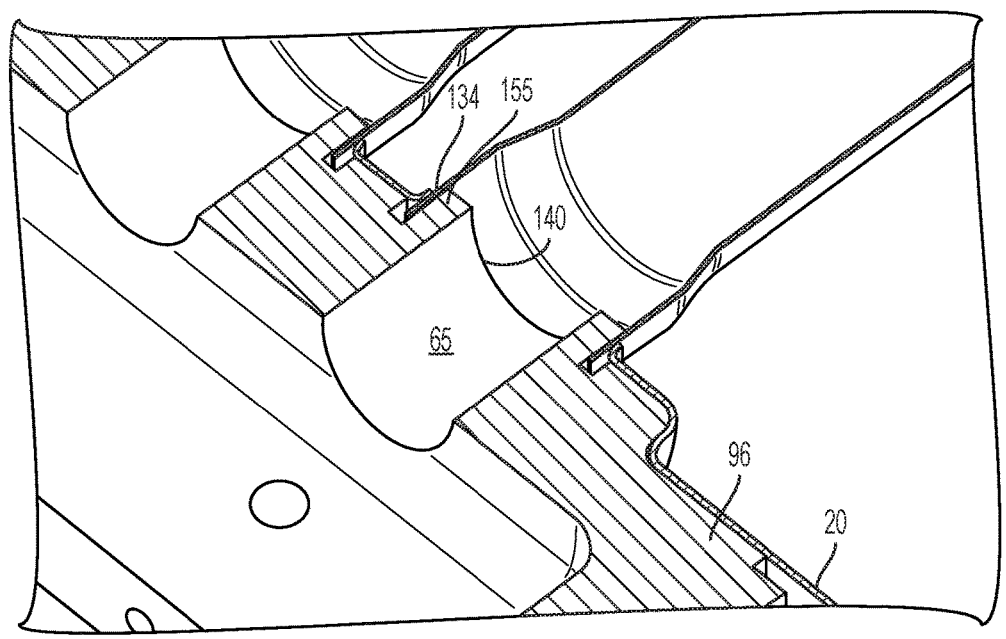
FIG. 10 is a partial section view of an interface between the premix burner assembly and the heat exchanger having an alternative thermal barrier.
Figure 11:
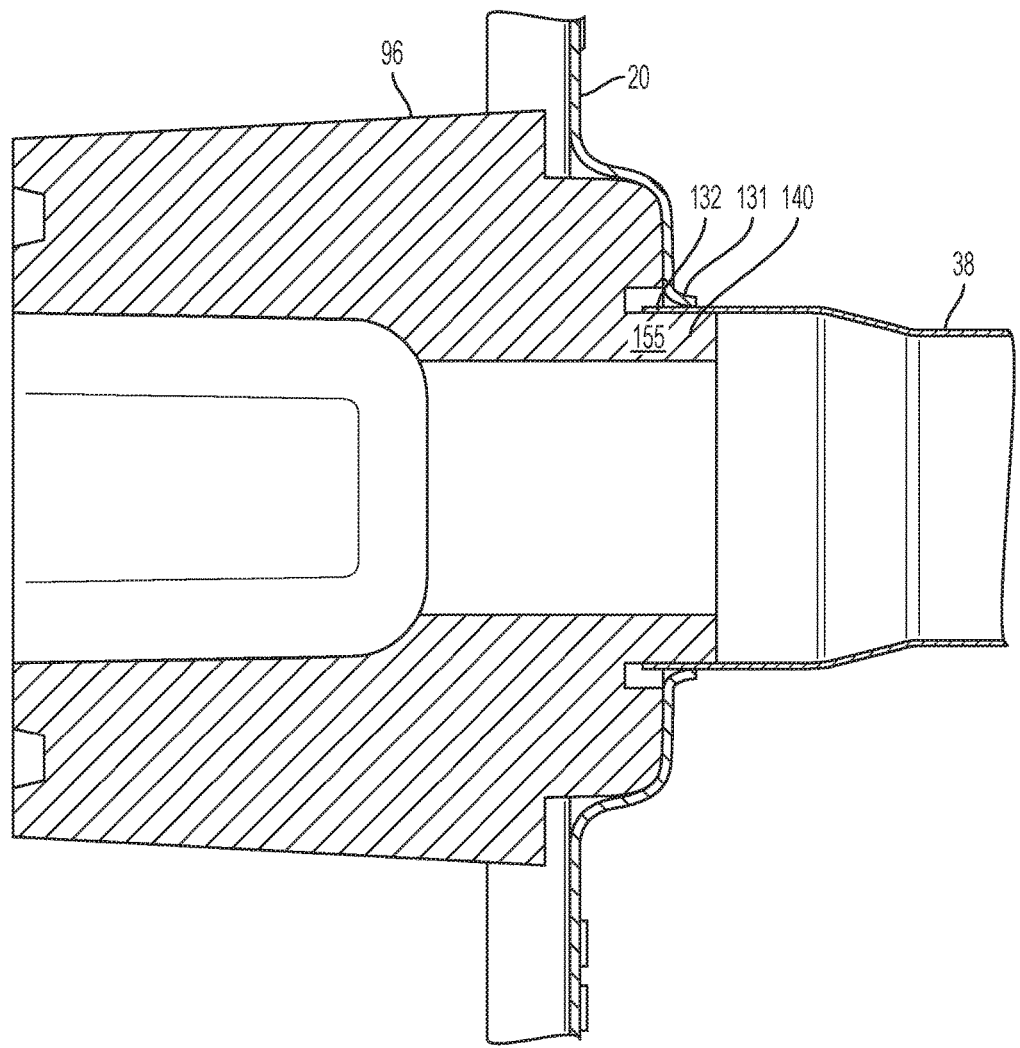
FIG. 11 is a partial perspective view of the interface between the premix burner assembly and the heat exchanger as shown in FIG. 10.
Figure 12:
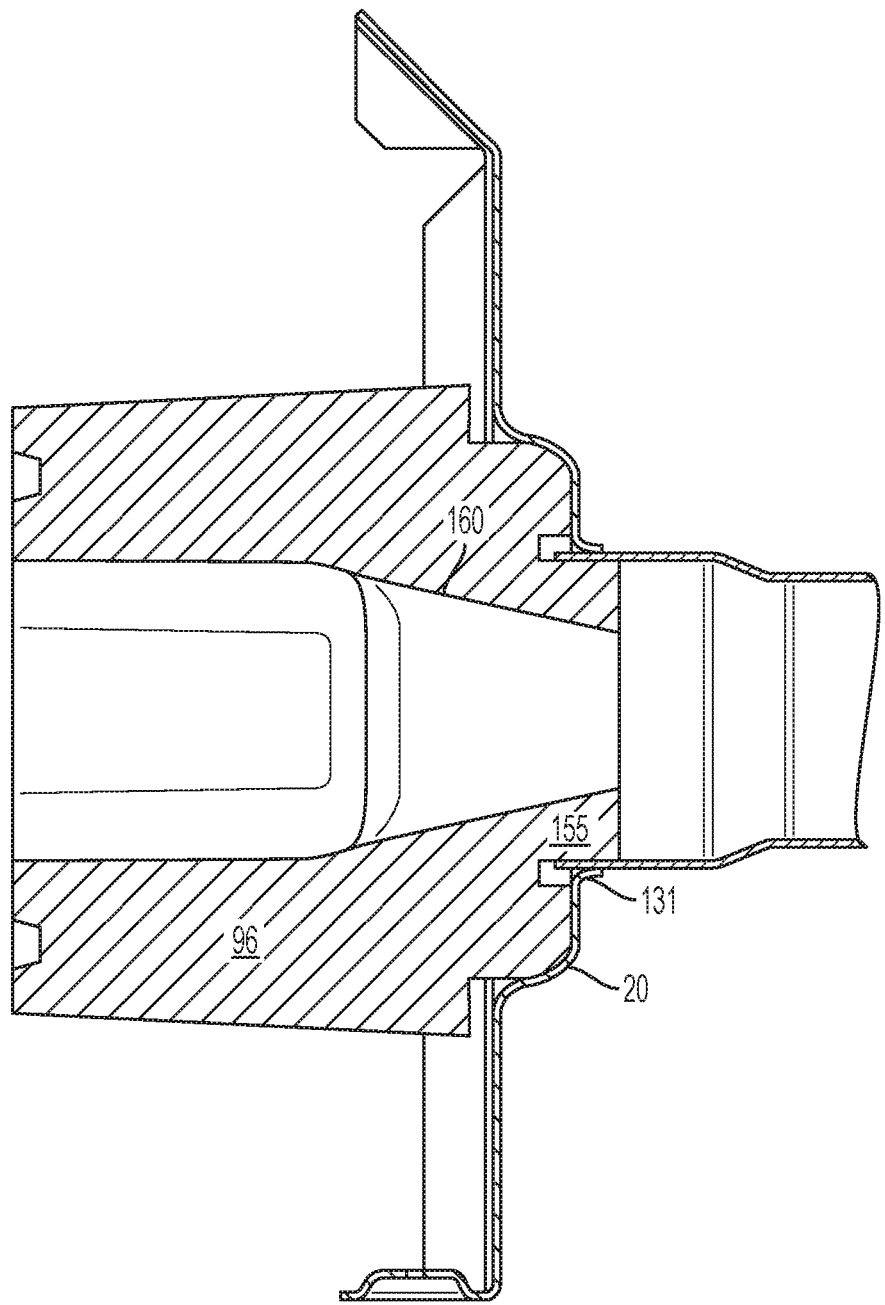
FIG. 12 is a partial section view of the interface between the premix burner assembly and the heat exchanger as in FIGS. 10 and 11 having an alternative refractory arrangement.

In a still further embodiment, illustrated in FIGS. 10 and 11, the barrier is formed as an annular extension 155 of the portion of refractory 96 that extends forward from and about each hole into each respective rearward end 40 of a tube 38. Extension 155 extends in a forward direction, with respect to the axis of elongated tube 38 beyond a point at which a plane perpendicular to the longitudinal axis passes through interface 134. Extension 155's dimensions (e.g., inner diameter and distance it protrudes into tube 38) are optimized similarly to the dimensions of insert 140, discussed above, to optimize durability, reduce thermals stresses at interface 134, facilitate flow into heat exchanger tubes 38, and optimize heat exchange through the walls of tubes 38. In FIG. 12, extension 155 again extends beyond interface 134 in the axial direction, but the central bore of refractory 96 also tapers so that the central bore or passage of refractory 96 narrows in the direction toward the forward end of the refractory and extension 155, so that the inner surface of the refractory bore is frustoconical in shape and provides a thicker width of extension 155 than is the case with a consistently cylindrical interior bore. The thicker width of extension 155 increases its structural integrity.

The thermal barrier may take various other forms. For example, the barrier may be a coating of insulation foam that is sprayed or otherwise disposed against interface 134.

Further, rather than (or in addition to) using a swage connection for interface 134, tube portion 135 may be rolled around lip 131.

Additionally, thicker tubes 38 and/or thicker material of center panel 20 may be used to strengthen interface 134.

Figure 14:
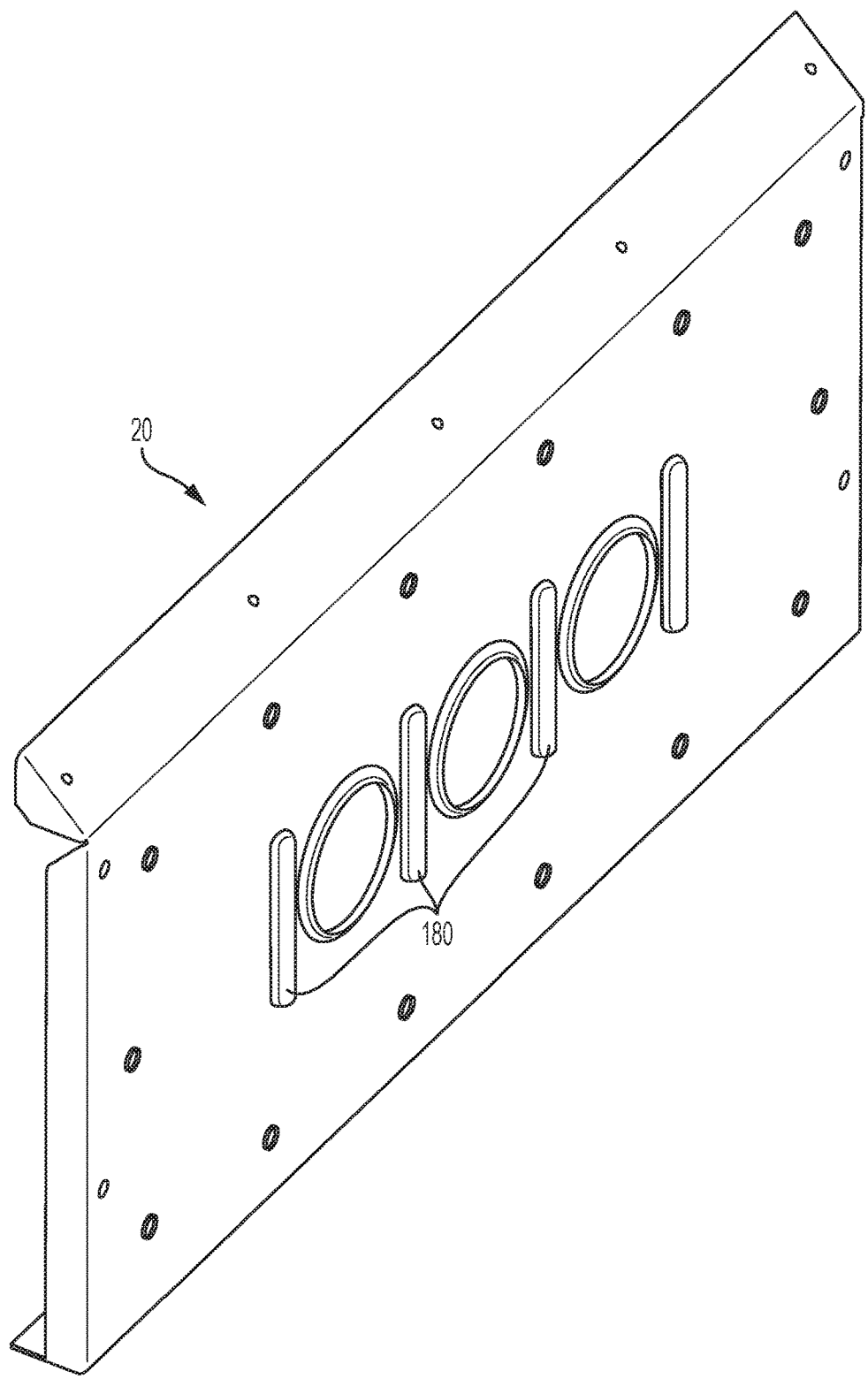
FIG. 14 is a perspective view of a center panel with ribs for use in the furnace of FIG. 1.
Figure 15A:
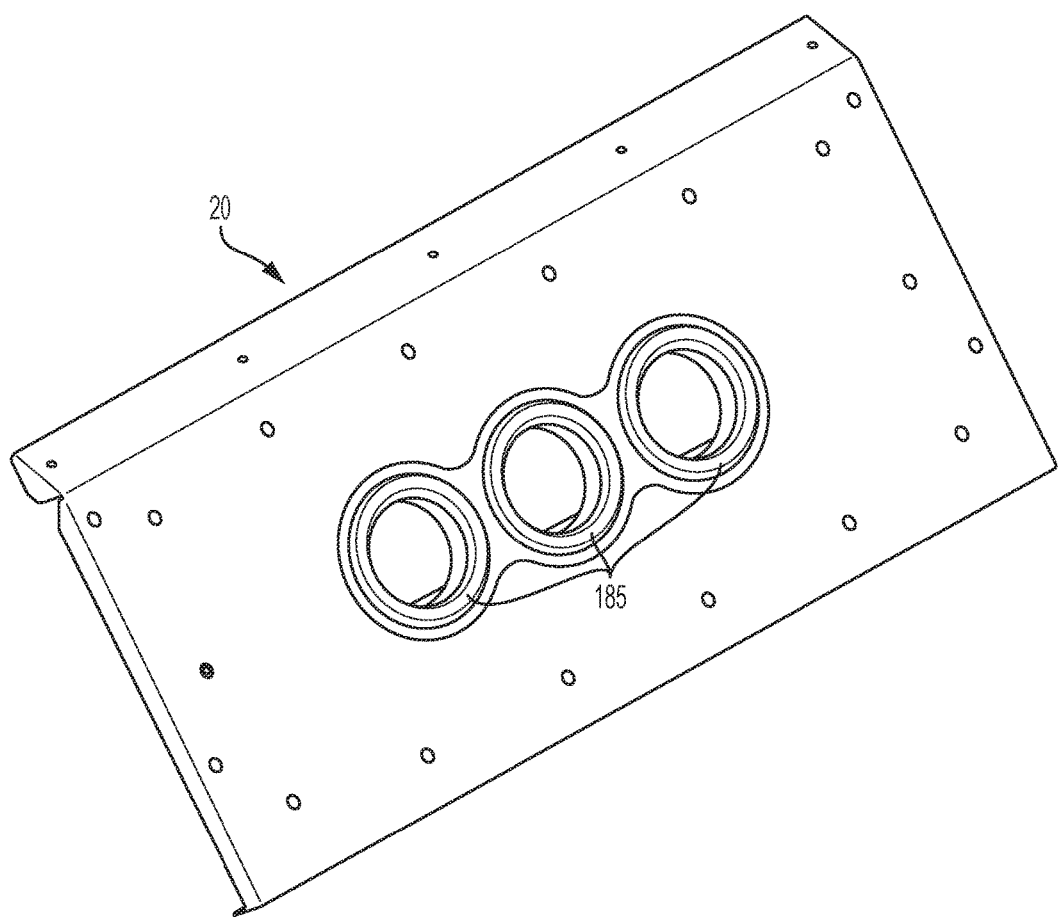
FIG. 15A is a perspective view of a center panel with round indentations for use in the furnace of FIG. 1.
Figure 15B:
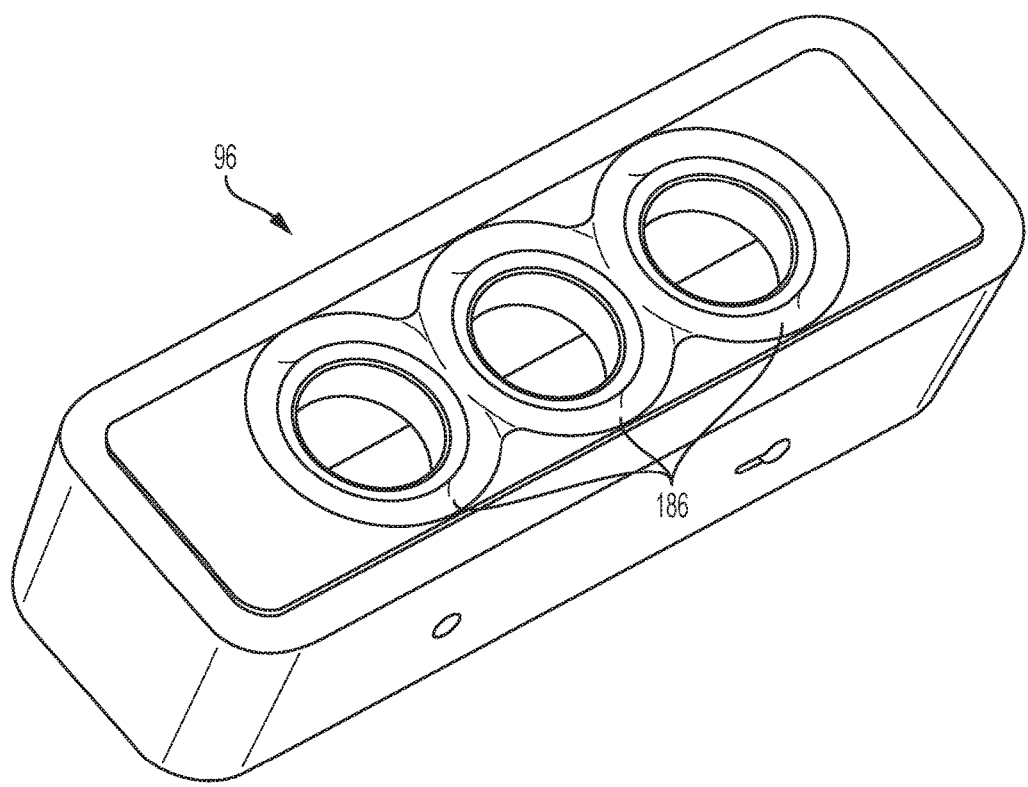
FIG. 15B is a perspective view of a refractory that mates with the center panel of FIG. 15A.

FIGS. 14, 15A, and 15B illustrate embodiments that further prevent failure of interface 134. FIG. 14 illustrates a center panel 20 with vertical ribs 180. Vertical ribs 180 serve to facilitate heat exchange with air 54 by providing a greater surface area than a planar face, thereby causing a greater heat exchange rate than a heat exchange rate between air 54 and a planar face of center panel 20. Additionally, vertical ribs 180 provide center panel 20 with greater sectional stiffness than that of a planar surface. Thus, the greater sectional stiffness reduces vibrations from thermal deformation of the primary tubes causing bending stress to the center panel. FIG. 15A illustrates a similar configuration, but instead of ribs 180, center panel has rings 185. Rings 185 similarly provide greater heat exchange surfaces and greater sectional stiffness than a planar face. FIG. 15B illustrates a refractory having ring cutouts 186 to receive a center panel with rings 185.

Further, burner 28 may be operated at a lower temperature, thereby reducing thermal stresses on all parts, including interface 134. For example, by controlling the ratio or amount of air and fuel delivered to the burner, burner 28 may be operated at a lower temperature. Alternatively, or in addition to varying the amount of air and fuel to burner 28, increasing airflow across tubes 38 reduces interface 134's temperature.

Figure 16:
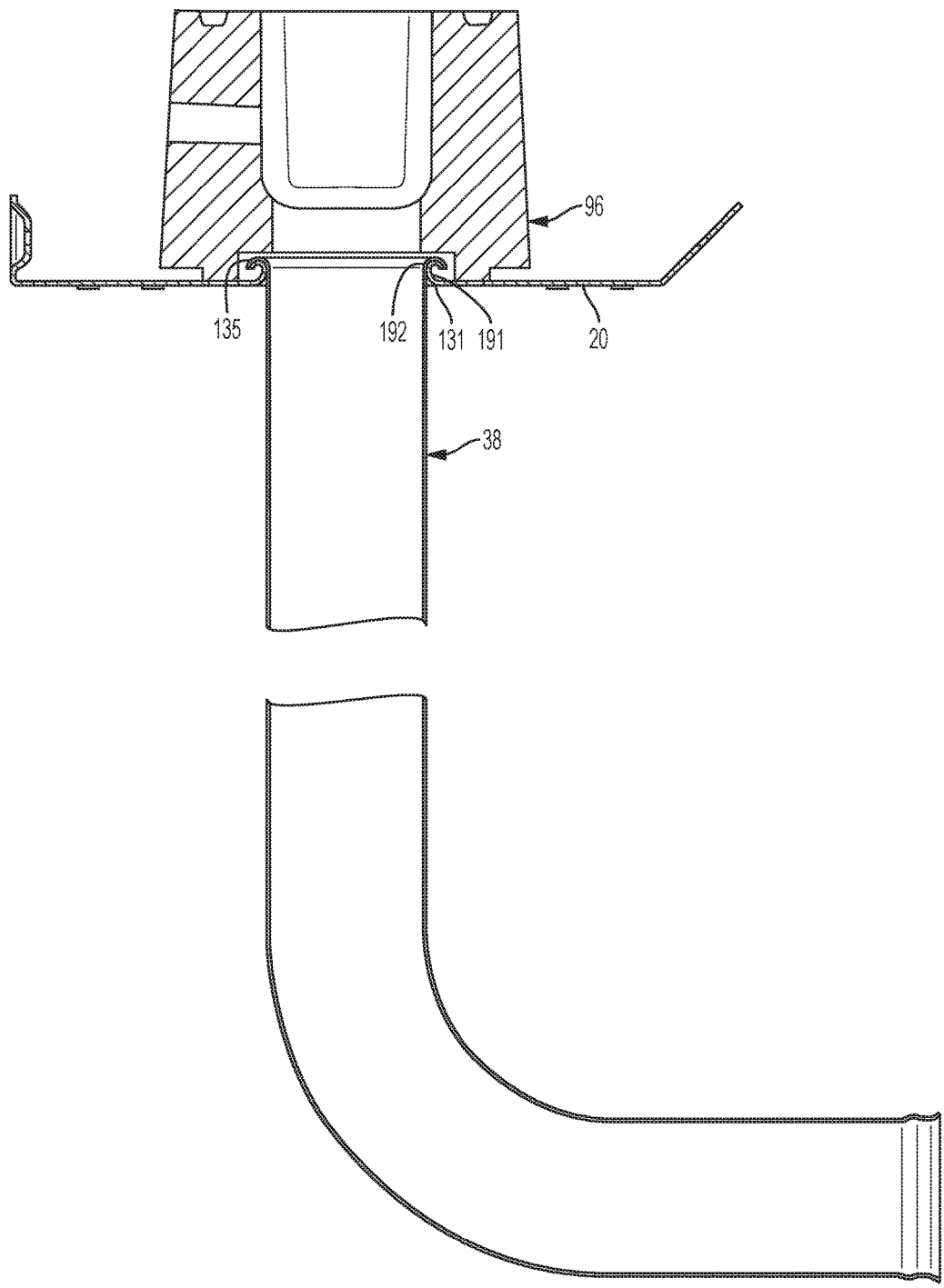
FIG. 16 is a perspective of an alternate interface to the interface of FIG. 5 between the premix burner assembly and the heat exchanger for use in the furnace of FIG. 1.

FIG. 16 illustrates a further embodiment for preventing failure of the interface between center panel 20 and tube 38. In the illustrated embodiment, lip 131 is rolled about 270 degrees to form a loop 191—that is, a shape matching a loop revolved around a centerline defined as a line extending through the center of the hole and perpendicular to the plane of center panel 20 (e.g., having a surface matching a portion of a ring torus). End 135 of tube 38 is rolled outward (away from tube 38's interior) approximately 180 degrees and against lip 131's outer surface, thereby creating a rolled interface 192 with a greater surface area (i.e. the area over which center panel 20 and tube 38 are adjacent) than the surface area of swaged interface 134 as shown in, for example, FIG. 5. Because interface 192 has a greater surface area than interface 134, in order for interface to fail and leak combustion gasses, a gap must extend through a greater length than interface 134. Further, because of the greater surface area, stresses are less concentrated across the rolled interface 134 than in the swaged configuration of interface 134 with the lesser surface area. Thus, rolled interface 192 distributes stresses over the contact area to minimize stress concentration. Moreover, rolling both center panel 20 and tube 38 together limits relative movement between each other, thereby limiting directions (in the illustrated embodiment, only axial movement is possible) in which the parts may separate to create a gap for leaking combustion gasses. In a further embodiment, end 135 is rolled further (i.e., beyond 270 degrees), thereby "locking" center panel 20 and tube 38 together and limiting any relative movement without deformation of at least one of center panel 20 and tube 38. Thus, interface 192 may be able to resist failure better than swaged interface 134 illustrated in FIG. 5.

As indicated above, the volume defined by mixing chamber 79/86 (FIGS. 2 and 3) and the components about burner 94 that define combustion chamber 65 (FIG. 3) are fluidly sealed from the area ambient to the premix burner assembly and the input gas line, except for air diffuser 76 (FIGS. 2 and 3). Moreover, plate seal 92 engages center panel 20 about the through-holes in a fluid sealed manner, and open first ends 40 of tubes 38 (FIG. 1) engage and surround the through-holes in center panel 20 in a fluid sealed manner, so that the interior of tubes 38 fluidly connect with combustion chamber 65 without the influx of ambient air into the combustion chamber or the tubes. Also, tubes 38 sealingly connect to manifold 46. Manifold 46 sealingly connects to tubes 52. Tubes 52 sealingly connect to manifold 51, and manifold 51 sealingly connects to the input side of induction draft blower 30. Accordingly, the negative pressure created at the input of blower 30 and within manifold 51 is translated through tubes 52, manifold 46, and tubes 38 to combustion chamber 65 without drawing ambient air (other than through air diffuser 76) into the combustion chamber or into the combustion exhaust gas flow up to blower 30.

Extending through corresponding holes in the top of combustion chamber housing 98 are a flame sensor and spark igniter 95, and an LED indicator 84. Spark igniter 95 is operatively connected to controller 21 via conductive wiring and a power source so that actuation of igniter 95 by the controller causes the igniter to create a spark at its lower distal end, which extends down into the interior of the combustion chamber in front of and adjacent to main portion 93 and one of domes 91 of burner 94 and the output of a gas nozzle of the fuel enrichment system extending into the combustion chamber from the hole in the chamber wall at fitting 82 (FIG. 2), as discussed below. When controller 21 actuates induction draft blower 30 to thereby provide negative pressure to combustion chamber 65 via tubes 38 and 52 and controls valve 80 to open, pressurized gas flows into area 65 in response to the negative pressure and the gas line pressure. The controller also actuates igniter 95, thereby causing a spark at the burner surface that ignites the fuel from the fuel enrichment system, which is now flowing from the nozzle proximate the burner and which mixes with air initially present in the combustion chamber, causing a flame to hold at the nozzle, proximate the burner surface. The controller then controls valve 72 to open gas flow into mixing chamber 79/86 and from there to burner 94, at which the air/gas mixture ignited by the fuel enrichment system flame. The combustion of the premix air/fuel mixture continues through the warm up period. Further as a result of the negative pressure created by blower 30, hot gas generated by the combustion at burner 94 is drawn out of the combustion chamber through the holes in the forward face of refractory 96 and through center panel 20 and into and through tubes 38 and 52 to blower 30, through intervening manifolds 46 and 51.

While one or more preferred embodiments of the invention are described above, it should be appreciated by those skilled in the art that various modifications and variations can be made in the present invention without departing from the scope and spirit thereof. For example, elements of one embodiment may be combined with another embodiment to create a still further embodiment. It is intended that the present invention cover such modifications and variations as come within the scope and spirit of the present disclosure, the appended claims, and there equivalents.

What is claimed is:

1. A fuel-fired heating appliance comprising:
   a combustion chamber that defines an inner cavity and comprising an inlet end and an outlet end;
   a burner;
   a refractory comprising an inlet face that defines an inlet through aperture and an outlet face, the outlet face of the refractory comprising a counterbore recess that extends inward from the outlet face and defines a periphery of an outlet through aperture;
   wherein the burner and the refractory are disposed in the inner cavity of the combustion chamber such that a portion of the burner is disposed between the inlet face of the refractory and the inlet end of the combustion chamber;

a mounting bracket that is coupled to the outlet end of the combustion chamber to securely retain the refractory within the combustion chamber, the refractory defining a first housing adjacent the burner, the first housing configured to receive combustion gases from combustion at the burner;

a heat exchanger tube defining a second housing with an inlet disposed in the counterbore recess of the refractory and proximate the outlet face of the refractory of the first housing so that the inlet of the heat exchanger tube receives the combustion gases from the outlet through aperture of the refractory of the first housing, wherein heat from the combustion gases is conducted through the heat exchanger tube and wherein the heat exchanger tube is configured to transfer heat to air that is blown across an exterior of the heat exchanger tube to condition a space served by the fuel-fired heating appliance; and a barrier that is configured to inhibit heat transfer from the combustion gases to an interface between the mounting bracket and the heat exchanger tube at the outlet of the combustion chamber, wherein a portion of the barrier is disposed in the counterbore recess of the refractory such that the portion of the barrier is disposed between the inlet of the heat exchanger tube and the outlet face of the refractory while a remainder portion of the barrier extends towards and into an interior of the heat exchanger tube such that the barrier is disposed between the interface and the combustion gases as the combustion gases flow through the outlet of the combustion chamber and into the inlet of the heat exchanger tube.

2. The appliance of claim 1, wherein the barrier has a thickness extending between the combustion gases and the interface and a material composition so that the barrier provides sufficient thermal resistance to heat transfer between the combustion gases as the combustion gases flow through the outlet of the first housing and the inlet of the second housing to maintain a stress at the interface below a yield stress of the interface.

3. The appliance of claim 1, wherein the interface is a swaged interface.

4. The appliance of claim 3:
wherein the mounting bracket comprises an opening that is defined by an edge that extends about the opening,
wherein the edge of the mounting bracket that defines the opening extends away from an outer surface of the mounting bracket,
wherein the opening of the mounting bracket is configured to receive the heat exchanger tube therethrough such that an inner diameter of the edge of the mounting bracket engages an outer diameter of the heat exchanger tube to define the interface,
wherein the heat exchanger tube is swaged to form a first circumferential protrusion adjacent the inlet of the heat exchanger tube on a first side of the edge of the mounting bracket and a second circumferential protrusion on a second side of the edge of the mounting bracket that is opposite the first circumferential protrusion,
wherein a surface of the heat exchanger tube that engages the inner diameter of the edge of the mounting bracket biases into engagement with the edge, and
wherein each of the first circumferential protrusion and the second circumferential protrusion has an outer diameter greater than the inner diameter of the edge, thereby defining the swaged interface.

5. A fuel-fired heating appliance comprising:
a combustion chamber that defines an inner cavity and comprising an inlet end and an outlet end;
a burner disposed within the inner cavity and at the inlet end of the combustion chamber, the burner having at least one outlet through which hot combustion gases are exhausted into the combustion chamber;
a heat exchanger comprising a combustion output tube that is disposed at the outlet end of the combustion chamber such that the combustion output tube is in fluid communication with the combustion chamber to receive the hot combustion gases from the inner cavity of the combustion chamber;
a mounting bracket having at least one hole therethrough, the mounting bracket being coupled to the combustion chamber and the heat exchanger such that the at least one hole of the mounting bracket is aligned with an opening defined by the outlet end of the combustion chamber and the combustion output tube extends into the combustion chamber through the at least one hole of the mounting bracket and the opening defined by the outlet end of the combustion chamber; and
an insulating barrier that is configured to inhibit heat transfer from the hot combustion gases flowing through the heat exchanger to an interface between the at least one combustion output tube and the mounting bracket, wherein the insulating barrier is disposed at the outlet end of the combustion chamber such that at least a portion of the insulating barrier is disposed in the combustion chamber while a remainder portion of the insulating barrier extends towards and into an interior of the combustion output tube between the hot combustion gases and the interface.

6. The appliance of claim 5, wherein the interface has a yield stress, and wherein the insulating barrier has a thickness extending between the hot combustion gases and the interface, and a material composition so that the insulating barrier provides sufficient thermal resistance to heat transfer between the combustion gases as the combustion gases flow through the outlet of the combustion chamber and an inlet of the combustion output tube to maintain a stress at the interface below a yield stress of the interface.

7. The appliance of claim 5, wherein the interface is a swaged interface.

8. The appliance of claim 7, wherein the bracket defines a respective edge at and extending about the at least one hole that extends away from an outer surface of the mounting bracket so that, at each said hole, an inner diameter of the edge engages an outer diameter of the combustion output tube, and wherein the combustion output tube extends into the outlet end of the combustion chamber through the at least one hole and is swaged to form a first circumferential protrusion on a first side of the edge and a second circumferential protrusion on a second side of the edge opposite the first circumferential protrusion, wherein a surface of the combustion output tube that engages the inner diameter of the edge biases into engagement with the edge and wherein each of the first circumferential protrusion and the second circumferential protrusion has an outer diameter greater than the inner diameter of the edge, thereby defining a swaged interface.

9. The appliance of claim 5, wherein the insulating barrier defines a generally cylindrical portion with annular cross sections disposed at least partially within the combustion output tube.

10. The appliance of claim 6, wherein the combustion chamber comprises a refractory disposed therein such that the refractory encloses a volume that extends from a burner surface at which combustion occurs to the mounting bracket, wherein the refractory defines a recess therein from a surface of the refractory adjacent the bracket, and wherein the insulating barrier extends into the recess and seats against a surface of the recess.

11. The appliance of claim 10, wherein the insulating barrier comprises a flange which mates with the recess of the refractory.

12. The appliance of claim 11, wherein an engagement between the insulating barrier and the refractory blocks passage of the hot combustion gases to the interface.

13. A fuel-fired heating appliance comprising:
an assembly comprising:
 a burner;
 a refractory coupled to the burner at an inlet end of the refractory, the refractory enclosing a volume extending from a burner surface of the burner at which combustion occurs so that the volume receives hot combustion gases exhausted from the combustion;
a heat exchanger comprising a combustion output tube that is disposed at an outlet end of the refractory such that the heat exchanger is in fluid communication with the volume; and
a mounting bracket coupled to the assembly and the heat exchanger and having a hole therethrough, wherein the combustion output tube extends through the hole,
wherein a portion of the refractory extends towards and into an interior of the combustion output tube such that the portion of the refractory is disposed between the hot combustion gases and an interface between the mounting bracket and the combustion output tube, wherein the portion of the refractory defines a thermal resistance that inhibits heat transfer from the hot combustion gases to the interface.

14. The appliance of claim 13, wherein the interface has a yield stress, and wherein the portion of the refractory that extends into the combustion output tube has a thickness extending between the hot combustion gases and the interface, and a material composition so that the portion of the refractory provides sufficient thermal resistance to heat transfer between the combustion gases and the interface as the combustion gases flow through the combustion output tube to maintain a stress at the interface below a yield stress of the interface.

* * * * *